United States Patent
Dai et al.

(10) Patent No.: US 10,222,484 B2
(45) Date of Patent: Mar. 5, 2019

(54) SATELLITE NAVIGATION RECEIVER WITH IMPROVED AMBIGUITY RESOLUTION

(71) Applicant: Deere & Company, Moline, IL (US)

(72) Inventors: Liwen Dai, Torrance, CA (US); Michael Zeitzew, Redondo Beach, CA (US)

(73) Assignee: DEERE & COMPANY, Moline, IL (US)

( * ) Notice: Subject to any disclaimer, the term of this patent is extended or adjusted under 35 U.S.C. 154(b) by 328 days.

(21) Appl. No.: 15/281,014

(22) Filed: Sep. 29, 2016

(65) Prior Publication Data

US 2017/0269229 A1 Sep. 21, 2017

Related U.S. Application Data

(60) Provisional application No. 62/310,297, filed on Mar. 18, 2016.

(51) Int. Cl.
G01S 19/44 (2010.01)
G01S 19/32 (2010.01)

(52) U.S. Cl.
CPC .............. *G01S 19/44* (2013.01); *G01S 19/32* (2013.01)

(58) Field of Classification Search
CPC .......... G01S 19/44; G01S 19/32; G01S 19/43; G01S 19/04; G01S 19/36

(Continued)

(56) References Cited

U.S. PATENT DOCUMENTS 5,610,614 A 3/1997 Talbot et al.
5,757,646 A 5/1998 Talbot et al.
(Continued)

FOREIGN PATENT DOCUMENTS

EP 2759849 A1 7/2014
WO WO-2010021656 A2 * 2/2010 ............. G01S 19/44

OTHER PUBLICATIONS

Chassagne, Olivier. "The Future of Satellite Navigation, One-Centimeter Accuracy with PPP", GNSS Forum, pp. 51-54, Mar.-Apr. 2012 [online] [retrieved on Aug. 31, 2016]. Retrieved from the Internet: <URL:http://www.insidegnss.com/auto/marapr12-Chassagne.pdf>.

(Continued)

*Primary Examiner* — Harry K Liu
(74) *Attorney, Agent, or Firm* — Neal, Gerber & Eisenberg, LLP; James P. Muraff

(57) ABSTRACT

A satellite navigation receiver and associated methods are described that can provide improved integer ambiguity resolution and more accurate positioning information. A modified BIE process may be utilized to enable the receiver to perform the integer ambiguity resolution more optimally. The output of the modified BIE process may be time-domain smoothed to provide a solution which is smoother in ambiguity space, and therefore also provide a position solution that is smoother in time. Transitions between an ambiguity-determined solution to a float solution, when necessary, may be smoothed in time. A weighting scheme may dynamically blend the ambiguity-determined solution and the float solution to leverage the advantages of both solutions, such as faster pull-in, higher accuracy, and more stable and smooth performance.

28 Claims, 8 Drawing Sheets

(58) Field of Classification Search
USPC .................................................. 342/357.27
See application file for complete search history.

(56) References Cited

U.S. PATENT DOCUMENTS

| | | | |
|---|---|---|---|
| 7,119,741 | B2 | 10/2006 | Sharpe et al. |
| 7,961,143 | B2 | 6/2011 | Dai et al. |
| 8,368,590 | B2 | 2/2013 | Vollath et al. |
| 8,368,591 | B2 | 2/2013 | Talbot et al. |
| 8,542,146 | B2 | 9/2013 | Vollath |
| 8,773,303 | B2 | 7/2014 | Doucet et al. |
| 9,057,780 | B2 | 6/2015 | Bar-Sever et al. |
| 9,128,176 | B2 | 9/2015 | Seeger |
| 9,146,319 | B2 | 9/2015 | Leandro |
| 2005/0101248 | A1 | 5/2005 | Vollath |
| 2005/0190103 | A1* | 9/2005 | Rapoport ................ G01S 19/44 342/357.27 |
| 2008/0074319 | A1 | 3/2008 | Han et al. |
| 2008/0122695 | A1 | 5/2008 | Wang et al. |
| 2008/0297408 | A1 | 12/2008 | Dai et al. |
| 2009/0066574 | A1 | 3/2009 | De Lorenzo et al. |
| 2011/0148698 | A1 | 6/2011 | Vollath |
| 2011/0187590 | A1 | 8/2011 | Leandro |
| 2012/0176271 | A1 | 7/2012 | Dai et al. |
| 2013/0335266 | A1 | 12/2013 | Vollath et al. |
| 2014/0015712 | A1 | 1/2014 | Leandro et al. |
| 2015/0088814 | A1 | 3/2015 | van der Laan et al. |
| 2017/0269228 | A1 | 9/2017 | Dai et al. |
| 2017/0269230 | A1 | 9/2017 | Dai et al. |

OTHER PUBLICATIONS

Choy, Suelynn."GNSS Precise Point Positioning: A Fad or the Future of Satellite Navigation and Positioning?" Lecture slides [online].School of Mathematical and Geospatial Sciences Royal Melbourne Institute of Technology University, Australia, 2014 [retrieved on Aug. 31, 2016]. Retrieved from the Internet: <URL:http://www.fig.net/resources/proceedings/fig_proceedings/fig2014/ppt/TS05A/Choy.pdf>.
Murfin, Tony. "Hexagon's Acquisition of Veripos: Why Did This Go Down?" GPS World [online], Apr. 16, 2014 [retrieved on Aug. 31, 2016]. Retrieved from the Internet: <URL:http://gpsworld.com/hexagons-acquisition-of-veripos-why-did-this-go-down/>.
Murfin, Tony. "Look, No Base-Station!—Precise Point Positioning (PPP)." GPS World [online], Mar. 20, 2013 [retrieved Aug. 31, 2016]. Retrieved from the Internet: <URL:http://gpsworld.com/look-no-base-station-precise-point-positioning-ppp/>.
Laurichesse, Denis. "Innovation: Carrier-Phase Ambiguity Resolution, Handling the Biases for Improved Triple-Frequency PPP Convergence." GPS World, Apr. 3, 2015 [online], [retrieved Aug. 31, 2016]. Retrieved from the Internet: <URL:http://gpsworld.com/innovation-carrier-phase-ambiguity-resolution/>.
Dixon, Kevin. "StarFire: A Global SBAS for Sub-Decimeter Precise Point Positioning." NavCom Technology Inc., ION GNSS 19th International Technical Meeting of the Satellite Division [online], Sep. 26-29, 2006 [retrieved on Aug. 31, 2016]. Retrieved from the Internet: <URL:http://www.gdgps.net/system-desc/papers/starfire.pdf>.
Shi, Junbo and Gao, Yang. "A Comparison of Three PPP Integer Ambiguity Resolution Methods." GPS Solutions 18.4 [online], 2013, pp. 519-528 [retrieved on Aug. 31, 2016]. Retrieved from the Internet: <URL:http://link.springer.com/article/10.1007/s10291-013-0348-2>.
Leandro, R., et al. "RTX Positioning: The Next Generation of cm-accurate Real-Time GNSS Positioning." Trimble Terrasat GmbH [online brochure], Sep. 2012 [retrieved on Aug. 31, 2016]. Retrieved from the Internet: <URL:https://www.trimble.com/positioning-services/pdf/WhitePaper_RTX.pdf>.
Goode, Matthew. "New Developments in Precise Offshore Positioning." Ocean Business / Offshore Survey [online presentation],Apr. 15-16, 2015, Southampton, United Kingdom [retrieved on Aug. 31, 2016]. Retrieved from the Internet: <URL:http://www.oceanbusiness.com/wp-content/uploads/2015/04/1410_MatthewGoode.pdf>.
Ott, Lee. "Use of Four GNSS Systems in Operational Precise Point Positioning Service." Furgo Satellite Positioning [online presentation], 2015 [retrieved on Aug. 31, 2016]. Retrieved from the Internet: <URL:http://www.gps.gov/cgsic/meetings/2015/ott.pdf>.
Toor, Pieter. "Munich Satellite Navigation Summit 2014."Veripos, Ltd. [online presentation], Mar. 26, 2014 [retrieved on Aug. 31, 2016]. Retrieved from the Internet: <URL:URL:http://www.terrastar.net/files/docs/Munich_Summit_2014_-_PPP_Session_-_Pieter_Toor_-_VERIPOS.pdf>.
Jokinen, Altti Samuli. "Enhanced Ambiguity Resolution and Integrity Monitoring Methods for Precise Point Positioning." Centre for Transport Studies, Department of Civil and Environmental Engineering, Imperial College London [online thesis], Aug. 2014 [retrieved on Aug. 31, 2016]. Retrieved from the Internet: <URL:https://spiral.imperial.ac.uk/bitstream/10044/1/24806/1/Jokinen-A-2014-PhD-Thesis.pdf>.
"Real-time Service." International GNSS Service [online article], 2015 [retrieved on Aug. 31, 2016]. Retrieved from the Internet: <URL:http://www.igs.org/rts>.
"Introducing the IGS Real-Time Service (RTS)." International GNSS Service [online], 2015 [retrieved on Aug. 31, 2016]. Retrieved from the Internet <URL:ftp://igs.org/pub/resource/pubs/IGS_Real_Time_Service-131031.pdf>.
Duman, Angie, et al. "PPP: IGS Announces the Launch of RTS-IGS." xyHt [online], Apr. 20, 2015 [retrieved on Aug. 31, 2016]. Retrieved from the Internet: <URL:http://www.xyht.com/professional-surveyor-archives/ppp-igs-announces-the-launch-of-rts-igs/>.
Laurichesse, D.; Mercier, F.; and Berthias, J. P. "Real-time PPP with Undifferenced Integer Ambiguity Resolution, Experimental Results." Proceedings of the ION GNSS [online] Sep. 21-24, 2010 [retrieved on Aug. 31, 2016]. Retrieved from the Internet <URL:http://www.ppp-wizard.net/Articles/laurichesse_ion_gnss_2010_bdp.pdf>.
Blewitt, Geoffrey. "Carrier Phase Ambiguity Resolution for the Global Positioning System Applied to Geodetic Baselines up to 2000 km." Journal of Geophysical Research [online], vol. 94, No. B8, pp. 10187-10203, Aug. 10, 1989 [retrieved on Aug. 31, 2016]. Retrieved from the Internet: <URL:http://www.colorado.edu/ASEN/asen6090/blewitt.pdf#page=1&zoom=auto,-154,811>.
Banville, Simon. "Ambiguity Resolution." BlackDot GNSS [online], Apr. 25, 2015 [retrieved on Sep. 6, 2016]. Retrieved from the Internet <URL:http://www.blackdotgnss.com/2015/04/25/ambiguity-resolution/>.
Teunissen, P.J.G. "Towards a Unified Theory of GNSS Ambiguity Resolution." Journal of Global Positioning Systems [online], vol. 2, No. 1, pp. 1-12, 2003 [retrieved on Sep. 6, 2016]. Retrieved from the Internet <URL:http://citeseerx.ist.psu.edu/viewdoc/download?doi=10.1.1.454.4430&rep=rep1&type=pdf>.
Teunissen, P.J.G. "Least-Squares Estimation of the Integer GPS Ambiguities." International Association of Geodesy General Meeting, Section IV: Theory and methodology, Beijing, China, 1993 [online] retrieved on Sep. 6, 2016]. Retrieved from the Internet: <URL:http://citeseerx.ist.psu.edu/viewdoc/download?doi=10.1.1.475.9393&rep=rep1&type=pdf>.
"Hemisphere GNSS Debuts Atlas GNSS Correction Service." GPS World Staff. GPS World [online], Jun. 15, 2015 [retrieved on Sep. 6, 2016]. Retrieved from the Internet: <URL:http://gpsworld.com/hemisphere-gnss-debuts-atlas-gnss-correction-service/>.
Teunissen, P.J.G. "GNSS Ambiguity Bootstrapping: Theory and Application." Proceedings of International Symposium on Kinematic Systems in Geodesy, Geomatics and Navigation [online], pp. 246-254, Jun. 2001 [retrieved on Nov. 16, 2016]. Retrieved from the Internet <URL:http://www.ucalgary.ca/engo_webdocs/SpecialPublications/KIS%2001/PDF/0503.PDF>.
Teunissen, P.J.G. "Theory of Integer Equivariant Estimation with Application to GNSS." Journal of Geodesy [online], vol. 77, No. 7-8, pp. 402-410, 2003 [retrieved on Nov. 16, 2016]. Retrieved from the Internet <URL:http://link.springer.com/article/10.1007/s00190-003-0344-3>.
Wen, Zhibo, et al. "Best Integer Equivariant Estimation for Precise Point Positioning." Institute for Communications and Navigation

(56) References Cited

OTHER PUBLICATIONS

2012 Proceedings [online], pp. 279-282, Sep. 12-14, 2012 [retrieved on Sep. 6, 2016]. Retrieved from the Internet <URL:http://ieeexplore.ieee.org/xpls/abs_all.jsp?arnumber=6338525&tag=1>.
Shi, J., Gao, Y. "A Fast Integer Ambiguity Resolution Method for PPP." Proceedings of the ION GNSS [online], Nashville, TN, pp. 3728-3734, Sep. 17-21, 2012 [retrieved on Nov. 16, 2016]. Retrieved from the Internet <URL:https://www.ion.org/publications/abstract.cfm?articleID=10548>.
Teunissen, P.J.G. "The Least-squares Ambiguity Decorrelation Adjustment: A Method for Fast GPS Integer Ambiguity Estimation." Journal of Geodesy [online], vol. 70, No. 1-2 pp. 65-82, 1995 [retrieved on Nov. 16, 2016]. Retrieved from the Internet <URL:http://link.springer.com/article/10.1007/BF00863419>.
De Jonge, P. and Tiberius, C. "The LAMBDA Method for Integer Ambiguity Estimation: Implementation Aspects." Publications of the Delft Computing Centre [online], LGR-Series No. 12, pp. 1-47, Aug. 1996 [retrieved on Sep. 6, 2016]. Retrieved from the Internet <URL:http://www.citg.tudelft.nl/fileadmin/Faculteit/CiTG/Over_de_faculteit/Afdelingen/Afdeling_Geoscience_and_Remote_Sensing/pubs/lgr12.pdf>.
Chang, X. W., Yang, X. and Zhou, T. "MLAMBAD: A Modified LAMBDA Method for Integer Least-squares Estimation." Journal of Geodesy [online], vol. 79, No. 9, pp. 552-565, Dec. 2005 [retrieved on Sep. 6, 2016]. Retrieved from the Internet <URL:http://www.cs.mcgill.ca/~chang/pub/MLAMBDA.pdf>.
Baroni, Leandro and Kuga, Helio K. "Evaluation of Two Integer Ambiguity Resolution Methods for Real Time GPS Positioning." WSEAS Transactions on Systems 8.3, pp. 323-333, Mar. 2009 [retrieved on Sep. 6, 2016]. Retrieved from the Internet <URL:https://www.researchgate.net/profile/Helio_Kuga/publication/41146341_Evaluation_of_Two_Integer_Ambiguity_Resolution_Methods_for_Real_Time_GPS_Positioning/links/543687fe0cf2bf1f1f2bd8d1.pdf>.
Verhagen, Sandra. "The GNSS Integer Ambiguities: Estimation and Validation." Delft Institute of Earth Observation and Space Systems, Delft University of Technology, Jan. 31, 2005 [retrieved on Sep. 6, 2016]. Retrieved from the Internet <URL:http://repository.tudelft.nl/islandora/object/uuid:07c6f2be-3a70-42aa-97b3-894a5770454d/?collection=research>.
Lin, P. and Zhang, X. "Precise Point Positioning With Partial Ambiguity Fixing." Sensors [online journal], vol. 15, No. 6, pp. 13627-13643, Jun. 10, 2015 [retrieved on Sep. 6, 2016]. Retrieved from the Internet:<URL:http://www.mdpi.com/1424-8220/15/6/13627/htm>.
Verhagen, Sandra, et al. "GNSS Ambiguity Resolution: Which Subset to Fix?" IGNSS Symposium 2011, International Global Navigation Satellite Systems Society, University of New South Wales, Sydney, Australia, Nov. 15-17, 2011 [retrieved on Sep, 6, 2016]. Retrieved from the Internet:<URL:http://repository.tudelft.nl/islandora/object/uuid:075deb5b-5253-4daf-97be-f71265196 12b/?collection=research>.
Pan, L., Cai, C., Santerre, R. and Zhu, J. "Combined GPS/GLONASS Precise Point Positioning with Fixed GPS Ambiguities." Sensors [online journal], vol. 14, No. 9, pp. 17530-17547, Sep. 18, 2014 [retrieved on Sep. 6, 2016]. Retrieved from the Internet: <URL:http://www.mdpi.com/1424-8220/14/9/17530/htm>. <DOI:10.3390/s140917530>.
Gratton, L., Joerger, M. and Pervan, B. "Carrier Phase Relative RAIM Algorithms and Protection Level Derivation." Journal of Navigation [online], vol. 63, No. 2, pp. 215-231, Apr. 1, 2010 [retrieved on Sep. 6, 2016]. Retrieved from the Internet: <URL:https://www.cambridge.org/core/journals/journal-of-navigation/article/div-classtitlecarrier-phase-relative-raim-algorithms-and-protection-level-derivationdiv/AEA4489E97E3C131EBD3E2184B3F0DD7> <DOI:10.1017/S0373463309990403>.
"Trimble XFill RTK." Trimble Navigation Limited [online white paper], Sep. 2012 [retrieved on Sep. 6, 2016]. Retrieved from the Internet: < URL: http://trl.trimble.com/docushare/dsweb/Get/Document-630776/022543-551_Trimble%20xFill%20White%20Paper_1012_sec.pdf>.
NovAtelCORRECT. NovAtel Inc. [online brochure], Nov. 2015 [retrieved on Sep. 6, 2016]. Retrieved from the Internet: <URL:http://www.novatel.com/assets/Documents/Papers/NovAtelCORRECT-Brochure.pdf>.
Reußnerr, N. and Wanniger, L. "GLONASS Inter-frequency Code Biases and PPP Carrier-Phase Ambiguity Resolution." Geodetic Institute, Technische Universität Dresden, IGS Workshop, Jul. 2012 [retrieved Aug. 31, 2016]. Retrieved from the Internet: <URL:https://tu-dresden.de/bu/umwelt/geo/gi/gg/ressourcen/dateien/veroeffentlichungen/igs2012.pdf?lang=en>.
Sleewagen, J., et al. "Digital versus Analog: Demystifying GLONASS Inter-Frequency Carrier Phase Biases." Inside GNSS [online], May/Jun. 2012 [retrieved Aug. 31, 2016]. Retrieved from the Internet<URL:http://www.insidegnss.com/auto/mayjune12-Sleewaegen.pdf>.
Carcanague, S., et al. "Finding the Right Algorithm Low-Cost, Single-Frequency GPS/GLONASS RTK for Road Users." Inside GNSS [online], vol. 8 No. 6, pp. 70-80, Nov./Dec. 2013 [retrieved Aug. 31, 2016]. Retrieved from the Internet: <URL:http://www.insidegnss.com/auto/novdec13-WP.pdf>.
Wang, J. and Feng, Y. "Reliability of Partial Ambiguity Fixing with Multiple GNSS Constellations." Journal of Geodesy [online], vol. 87, No. 1, pp. 1-14, Jun. 12, 2012 [retrieved Aug. 31, 2016]. Retrieved from the Internet:<URL:http://link.springer.com/article/10.1007/s00190-012-0573-4> <DOI:10.1007/s00190-012-0573-4>.
Sun et al. "An Improved Time-Frequency Analysis Method in Interference Detection for GNSS Receivers," Sensors 2015, 15, 9404-9426; doi:10.3390, pp. 9404-9426, [retrieved on Apr. 22, 2017]. Retrieved from the internet<http://www.mdpi.com/1424-8220/15/4/9404/pdf>.
Geng et al. "Towards PPP-RTK: Ambiguity resolution in real-time precise point positioning." In: Advances in space research. May 17, 2011 (May 17, 2011) Retrieved from <https://www.resweachgate.net/profile/J_Geng/publication/2483502218_Towards_PPP-RTK_Ambguity_resolution_in_real-time_precise_point_positioning/links/0c960532235a654655000000/Towards-PPP-RTK-Ambiguity-resolution-in-real-time-precise-point-positioning.pdf>, entire document.
Jokinen et al., "GLONASS Aided GPS Ambiguity Fixed Precise Point Positioning," The Journal of Navigation, 66: 399-416 (2013).
Notification of Transmittal of the International Search Report and the Written Opinion of the International Authority, or the Declaration dated Jul. 10, 2017 for PCT/US2017/021561.
Notification of Transmittal of the International Search Report and the Written Opinion of the International Authority, or the Declaration dated May 24, 2017 for PCT/US2017/021553.
Notification of Transmittal of the International Search Report and the Written Opinion of the International Authority, or the Declaration dated May 10, 2017 for PCT/US2017/021548.

\* cited by examiner

SATELLITE NAVIGATION RECEIVER WITH IMPROVED AMBIGUITY RESOLUTION

CROSS-REFERENCE TO RELATED APPLICATION

This application claims priority from U.S. Provisional Patent Application Ser. No. 62/310,297, which was filed on Mar. 18, 2016, which is incorporated herein by reference.

TECHNICAL FIELD

This application generally relates to a satellite navigation receiver having improved ambiguity resolution. In particular, this application relates to a precise point positioning real-time kinematic (PPP-RTK) satellite navigation receiver and associated methods that perform integer ambiguity resolution that is stable, robust, and accurate with fast initialization.

BACKGROUND

Global navigation satellite systems (GNSS) utilize satellites to enable a receiver to determine position, velocity, and time with very high accuracy and precision using signals transmitted from the satellites. Such GNSS include the Global Positioning System (GPS), GLONASS, and Galileo. The signals transmitted from the satellites include one or more carrier signals at separate known frequencies, such as a first carrier (L1), a second carrier (L2), and an additional third carrier (L5) in the GPS. A code, such as a pseudo-random (PN) noise code modulated with information, may modulate a carrier of the signal, and may be unique to each satellite. Because the satellites have known orbital positions with respect to time, the signals can be used to estimate the relative position between an antenna of a receiver and each satellite, based on the propagation time of one or more signals received from four or more of the satellites. In particular, the receiver can synchronize a local replica of the carrier and code transmitted in a signal to estimate the relative position.

The most accurate GNSS systems are referred to as precise point positioning real-time kinematic (PPP-RTK) or global RTK. The algorithms used in PPP-RTK systems are a combination of the algorithms used in local RTK systems and PPP systems. Both local RTK systems and PPP systems can achieve high accuracy by determining carrier phase related ambiguities. In local RTK systems, a roving receiver receives real-time corrections from a nearby local reference station, such as through a radio link. Because the local reference station has a known precise location, it can help determine the precise location of the roving receiver. In PPP systems, a roving receiver receives corrections that are globally applicable, which eliminates the need for local reference stations. The corrections can include information regarding the position and clock error of satellites, so that the roving receiver can receive information regarding the precise location of the satellites to help determine the precise location of the receiver. PPP systems have a global network of reference stations that are used to develop the global corrections, which are then transmitted to the roving receiver.

PPP-RTK systems involve integer ambiguity resolution at the global network of reference stations and at the roving receiver. PPP-RTK systems are often used in applications such as precision farming, military navigation, and marine offshore positioning, due to its improved navigation accuracy and simplified infrastructure (i.e., eliminating the need for local reference stations). However, current PPP-RTK systems do not typically have real-time integer ambiguity resolution that is simultaneously stable, robust, and accurate, and with fast initialization times.

Accordingly, there is an opportunity for a satellite navigation receiver that addresses these concerns. More particularly, there is an opportunity for a satellite navigation receiver and associated methods that can provide improved integer ambiguity resolution and more accurate positioning information.

SUMMARY

The systems and methods described herein may result in a mobile receiver with improved integer ambiguity resolution and more accurate positioning information. The real-time integer ambiguity resolution described herein may be simultaneously stable, robust, and accurate, and have fast initialization times. For example, a modified version of the best integer equivariant (BIE) process may enable the mobile receiver to perform the integer ambiguity resolution more optimally. The modified BIE process described below may compute sums of weights and weighted sums of candidate narrow lane integer ambiguities during a search of the candidate narrow lane integer ambiguities. This may eliminate the need to store a large number of candidates or choose artificial thresholds to control the number of candidates to explore or store. The modified BIE process may also utilize an adaptive weight scaling during the search of the candidate narrow lane integer ambiguities. This may mitigate potential numerical issues attributable to a possible large dynamic range in weight magnitudes of the candidates. The modified BIE process may further utilize dynamic thresholds to control when to terminate the search of the candidates. In this way, only those candidates whose weight is large enough to have a meaningful numerical impact are included.

Other features described herein also enable the mobile receiver to perform the integer ambiguity resolution more optimally. For example, the output of the modified BIE process may also be time-domain smoothed to provide a solution which is smoother in ambiguity space, and therefore also provide a position solution that is smoother in time. As another example, transitions between an ambiguity-determined solution to a float solution, when necessary, may be smoothed in time. As a further example, a weighting scheme may dynamically blend the ambiguity-determined solution and the float solution to leverage the advantages of both solutions, such as faster pull-in, higher accuracy, and more stable and smooth performance. The weighting scheme may utilize particular figures-of-merit and other heuristics to perform the blending.

DETAILED DESCRIPTION

Figure 1:
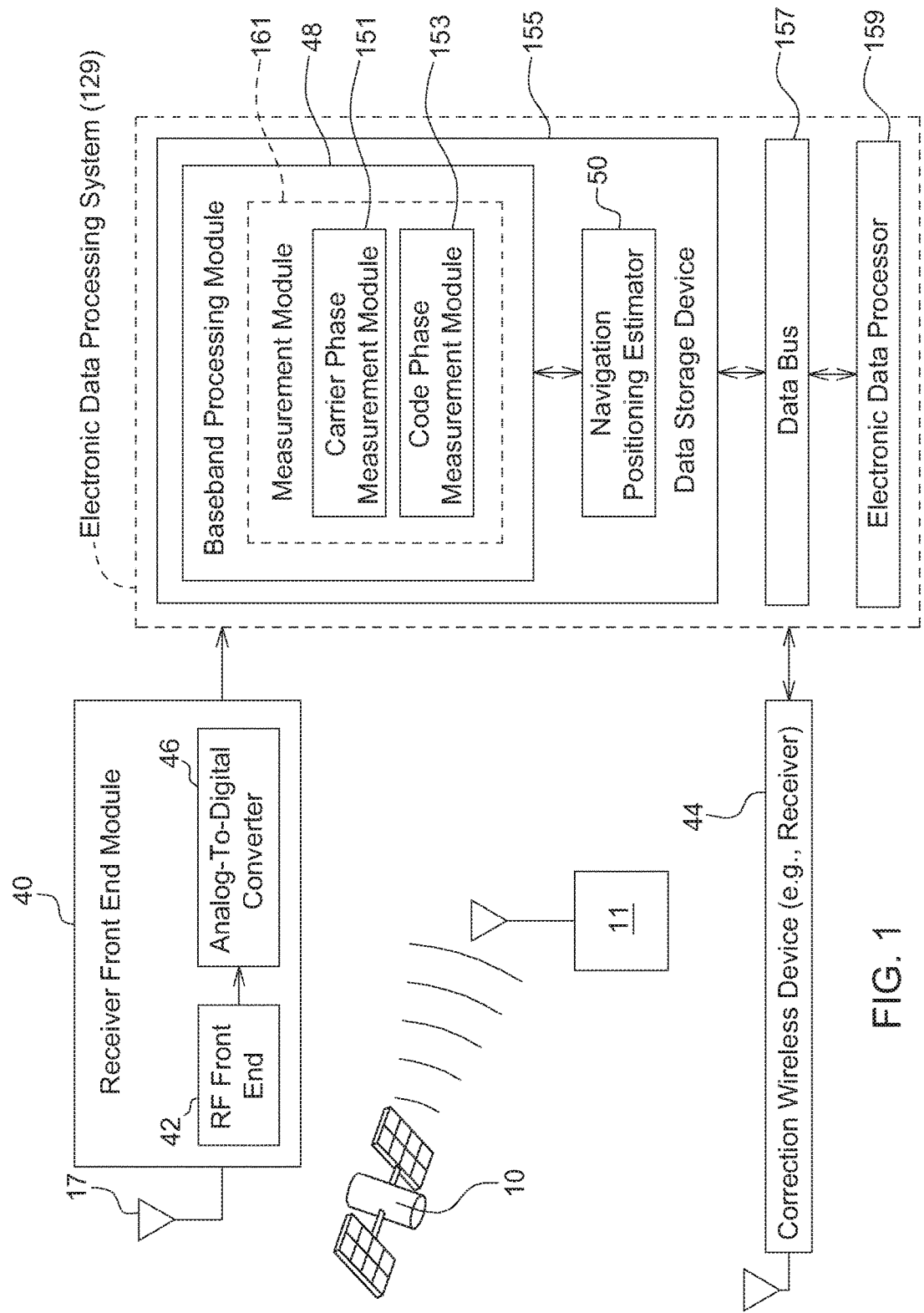
FIG. 1 is a block diagram of a satellite navigation receiver, in accordance with some embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

FIG. 1 shows a satellite navigation receiver 11 capable of receiving signals transmitted by satellites 10 that include one or more carrier signals (e.g., a first carrier (L1), a second carrier (L2) and an additional third carrier (L5) of the Global Positioning System (GPS)) such that the receiver 11 can determine position, velocity, and time with very high accuracy and precision based on the received signals. The received signals may be transmitted from one or more satellites 10, such as a GPS satellite, a Galileo-compatible satellite, or a Global Navigation Satellite System (GLONASS) satellite. The satellites 10 have approximately known orbital positions versus time that can be used to estimate the relative position between an antenna 17 of the receiver 11 and each satellite 10, based on the propagation time of one or more received signals between four or more of the satellites 10 and the antenna 17 of the receiver 11.

In any of the above referenced drawings of this document, any arrow or line that connects any blocks, components, modules, multiplexers, memory, data storage, accumulators, data processors, electronic components, oscillators, signal generators, or other electronic or software modules may comprise one or more of the following items: a physical path of electrical signals, a physical path of an electromagnetic signal, a logical path for data, one or more data buses, a circuit board trace, a transmission line; a link, call, communication, or data message between software modules, programs, data, or components; or transmission or reception of data messages, software instructions, modules, subroutines or components.

In embodiments, the receiver 11 described herein may comprise a computer-implemented system or method in which one or more data processors process, store, retrieve, and otherwise manipulate data via data buses and one or more data storage devices (e.g., accumulators or memory) as described in this document and the accompanying drawings. As used in this document, "configured to, adapted to, or arranged to" mean that the data processor or receiver 11 is programmed with suitable software instructions, software modules, executable code, data libraries, and/or requisite data to execute any referenced functions, mathematical operations, logical operations, calculations, determinations, processes, methods, algorithms, subroutines, or programs that are associated with one or more blocks set forth in FIG. 1 and/or any other drawing in this disclosure. Alternately, separately from, or cumulatively with the above definition, "configured to, adapted to, or arranged to" can mean that the receiver 11 comprises one or more components described herein as software modules, equivalent electronic hardware modules, or both to execute any referenced functions, mathematical operations, calculations, determinations, processes, methods, algorithms, or subroutines.

Precise point positioning (PPP) includes the use of precise satellite orbit and clock corrections provided wirelessly via correction data, rather than through normal satellite broadcast information (ephemeris and clock data) that is encoded on the received satellite signals, to determine a relative position or absolute position of a mobile receiver. PPP may use correction data that is applicable to a wide geographic area. Although the resulting positions can be accurate within a few centimeters using state-of-the-art algorithms, conventional precise point positioning can have a long convergence time of up to tens of minutes to stabilize and determine the float or integer ambiguity values necessary to achieve the purported (e.g., advertised) steady-state accuracy. Hence, such long convergence time is typically a limiting factor in the applicability of PPP.

As shown in FIG. 1, the receiver 11 may include a receiver front-end module 40 coupled to an electronic data processing system 129. Furthermore, a correction wireless device 44 (e.g., a receiver or transceiver) may provide correction data or differential correction data (e.g., PPP correction data) to enhance the accuracy of position estimates provided or estimated by the receiver 11.

In an embodiment, the receiver front-end module 40 includes a radio frequency (RF) front end 42 coupled to an analog-to-digital converter 46. The receiver front-end module 40 or the RF front end 42 may receive a set of carrier signals from one or more satellite transmitters on satellites. The analog-to-digital converter 46 may convert the set of carrier signals into digital signals, such as digital baseband signals or digital intermediate frequency signals for processing by the electronic data processing system 129.

In an embodiment, the electronic data processing system 129 includes a baseband processing module 48 (e.g., baseband/intermediate frequency processing module) and a navigation positioning estimator 50. For example, the baseband processing module 48 and the navigation positioning estimator 50 may be stored in a data storage device 155.

In an embodiment, the baseband processing module 48 may include a measurement module 161 that includes a carrier phase measurement module 151 and/or a code phase measurement module 153. The carrier phase measurement module 151 may facilitate the measurement of the carrier phase of one or more carrier signals received by the receiver 11. Similarly, the code phase measurement module 153 may facilitate the measurement of the code phase of one or more code signals that modulate the carrier signals received by the receiver 11.

The navigation positioning estimator 50 can use the carrier phase measurements and/or the code phase measurements to estimate the range between the receiver 11 and one or more satellites, or estimate the position (e.g., three dimensional coordinates) of the receiver 11 with respect to one or more satellites (e.g., four or more satellites). The ambiguities refer to the differences in the measurements, such as between-satellite single differences. The code phase measurements or carrier phase measurements can be converted from propagation times, between each satellite and the receiver 11 that is within reception range of the receiver, to distances by dividing the propagation time by the speed of light, for example.

In the electronic data processing system 129, the data storage device 155 may be coupled to a data bus 157. An electronic data processor 159 may communicate with the data storage device 155 and the correction wireless device 44 via the data bus 157. As used herein, the data processor 159 may include one or more of the following: an electronic data processor, a microprocessor, a microcontroller, an application specific integrated circuit (ASIC), digital signal processor (DSP), a programmable logic device, an arithmetic logic unit, or another electronic data processing device. The data storage device 155 may include electronic memory, registers, shift registers, volatile electronic memory, a magnetic storage device, an optical storage device, or any other device for storing data.

In an embodiment, the navigation positioning estimator 50 includes a precise position estimator, such as a precise point position (PPP) estimator or a wide area differential global navigation satellite system (GNSS) position estimator. The navigation positioning estimator 50 may receive correction data from the correction wireless device 44, which is a receiver or transceiver capable of communication with a wireless satellite communications device.

The mobile receiver described herein assumes that two frequencies are available and used for navigation. However, it is contemplated that the described concepts may be extended to cover scenarios with more than two frequencies, and to be usable with any GNSS systems.

The following description uses a notation system where individual terms may be related to a specific frequency, satellite, or receiver. The notation uses subscripts and superscripts to distinguish these elements and uses the location of the subscript or superscript to distinguish the elements, where frequency is designated by a numerical right subscript, receiver is designated by a left subscript, and satellite is designated by a left superscript. For example, the term $_R^kX_I$ refers to a frequency I, a receiver R, and a satellite k. A right superscript retains the usual meaning of an exponent. However, not all subscripts and superscripts may be designated for each term. As such, when an element is not relevant to the context of a particular equation, the subscript and/or superscript may be dropped.

In addition, the following description utilizes parameters and notation, including $f_i$ as a frequency in hertz, $\lambda_i$ as a wavelength of $f_i$ in meters, $P_i$ as a measured pseudorange in meters, $\Phi_i$ as a measured carrier phase in cycles, N as an integer number of ambiguity cycles, $\mathcal{N}$ as a non-integer (float) number of ambiguity cycles, and c as the speed of light in meters/second. Differences between satellite pairs are represented using $\nabla$ with left superscripts indicate the satellites involved. For example, the term $^{i,j}\nabla x$ is equal to $^ix - ^jx$.

Figure 2:
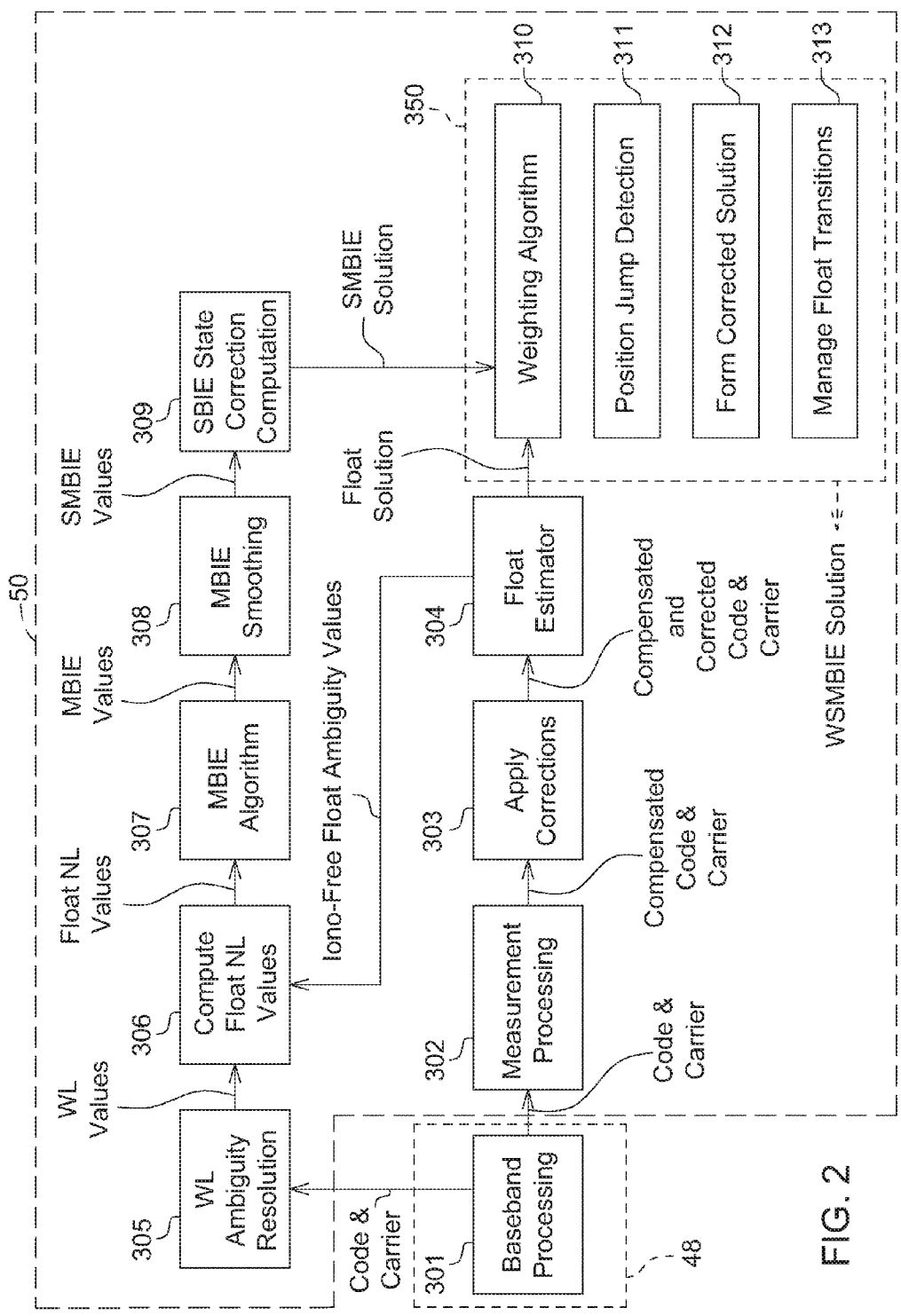
FIG. 2 is a system diagram illustrating a method of resolving integer ambiguities in a satellite navigation receiver, in accordance with some embodiments.

FIG. 2 shows a system diagram of operations within the receiver 11 for resolving integer ambiguities. The operations are shown as functional blocks within the baseband processing module 48 and the navigation positioning estimator 50. The text between the functional blocks generally denotes the output generated by a block.

Baseband processing at block 301 may be performed by the baseband processing module 48. The baseband processing may measure the pseudorange $P_i$ and carrier phase $\Phi_1$ of one or more received satellite signals. The uncorrected pseudorange $P_i$ and carrier phase $\Phi_1$ measurements, where the frequency i=1, 2, . . . , may be given as:

$$P_i = D + {}^kB_i + {}_RB_i + \frac{I}{f_i^2} + \epsilon_{P,i} \tag{1}$$

$$\Phi_i \lambda_i = D + {}^kb_i + {}_Rb_i - \frac{I}{f_i^2} + \delta PW_i + N_i \lambda_i + \epsilon_{\Phi,i} \tag{2}$$

$$D = \rho + {}^k\tau + {}_R\tau + T + \delta PC + \delta T + \delta R + \delta S, \tag{3}$$

where k=1, 2, . . . is the index of the satellite; $\rho$ is the geometric range in meters; B is the pseudorange bias in meters; b is the carrier phase bias in meters; I is the ionospheric error in meters-Hz²; $\epsilon_{P,i}$ is the pseudorange noise error in meters (including white noise, multipath, and remaining modeling errors); $\epsilon_{\Phi,i}$ is the carrier measurement noise error in meters (including white noise, multipath, and remaining modeling errors); $\tau$ is the clock error in meters; $_R\tau$ is the receiver clock error and is specific to a given GNSS system; T is the tropospheric delay in meters; $\delta PC$ is the phase center offset and variation in meters; $\delta T$ is the error due to tidal forces and polar motion in meters; OR is the relativistic effect on satellite clock in meters; $\delta S$ is the relativistic effect on signal propagation (the Shapiro delay) in meters; and $\delta PW$ is the phase windup error in meters.

An alternative to having a receiver clock error $_R\tau$ for each GNSS system is to estimate one clock for a designated primary constellation (e.g., GPS) and relative receiver clock offsets between the primary constellation and the other GNSS constellations. The tropospheric delay T is typically divided into a dry component $T_{dry}$ and a wet component $T_{wet}$. The dry component $T_{dry}$ can be accurately modeled using an a priori troposphere model, such as GPT2 (Global Pressure and Temperature). The remaining wet component $T_{wet}$ after removing an a priori wet model can be further estimated by one zenith bias with a mapping function bias and/or two additional horizontal gradient coefficients.

In blocks 302 and 303, the pseudorange $P_i$ and the carrier phase $\Phi_i$ from the baseband processing block 301 may be processed with models and measurement combinations to eliminate and/or reduce a subset of the error terms in equations (1), (2), and (3). For the ranging codes and the navigation message to travel from a satellite 10 to the receiver, they must be modulated onto a carrier frequency. In the case of GPS, two frequencies are utilized: one at 1575.42 MHz (10.23 MHz×154) called L1; and a second at 1227.60 MHz (10.23 MHz×120) called L2. Both L1 and L2 are in the satellite L-band.

The signals transmitted by GLONASS satellites 10 are derived from the fundamental frequencies of 1602 MHz for L1 and 1246 MHz for L2. Each GLONASS satellite 10 transmits on a different frequency using FDMA (frequency division multiple access) and according to a designated frequency channel number. The L1 center frequency for GLONASS is given by:

$$^k f_1 = 1602 \text{ MHz} + {}^k n \times 0.5625 \text{ MHz}, \qquad (4)$$

where $^k n$ is the frequency channel number of satellite k, and where $^k n \in \{-7, 6, \ldots, 6\}$. The L2 center frequency for GLONASS is given by:

$$^k f_2 = 1246 \text{ MHz} + {}^k n \times 0.4375 \text{ MHz}. \qquad (5)$$

In PPP systems, a float solution is based on processing ionosphere-free (IF) combinations of both the pseudorange $P_i$ and the carrier phase $\Phi_i$ on the two frequencies, as given by:

$$P_{IF} \triangleq \frac{f_1^2}{(f_1^2 - f_2^2)} P_1 - \frac{f_2^2}{(f_1^2 - f_2^2)} P_2 \qquad (6)$$

$$P_{IF} = D + {}^k B_{IF} + {}_R B_{IF} + {}^k \epsilon_{P,IF} \qquad (7)$$

$$\Phi_{IF} \triangleq \frac{f_1^2}{(f_1^2 - f_2^2)} \Phi_1 \lambda_1 - \frac{f_2^2}{(f_1^2 - f_2^2)} \Phi_2 \lambda_2 \qquad (8)$$

$$\Phi_{IF} \lambda_{IF} = D + {}^k b_{IF} + {}_R b_{IF} + \delta P W_{IF} + N_{IF} \lambda_{IF} + {}^k \epsilon_{\Phi,IF}, \qquad (9)$$

where $_R B_{IF}$ is the receiver ionosphere-free code bias, which is the ionosphere-free combination of the L1 receiver code bias and the L2 receiver code bias. There is a receiver ionosphere-free code bias per receiver and constellation for all visible CDMA satellites.

For GLONASS satellites, an additional inter-channel code bias may need to be estimated, if the magnitude of the inter-channel code bias is significant. In this case, the ionosphere-free pseudorange measurement is given as:

$$P_{IF} = D + {}^k B_{IF} + {}_R B_{IF} + {}_R {}^k C_{GLN} + {}^k \epsilon_{P,IF}, \qquad (10)$$

where $C_{GLN}$ is the GLONASS code bias in meters.

In PPP systems, one goal is to have a coherent model for receiver clock and bias terms. The measurement compensation may include compensating the measurements using broadcast satellite ephemeris and clock, compensating the measurements for the deterministic terms (e.g., δPC, δT, δR, δS, and δPW), and compensating the measurements for the PPP corrections for the satellite orbit and clock.

In blocks 302 and 303, it is assumed there is a common receiver clock term for both the pseudorange $P_i$ and the carrier phase $\Phi_i$. The receiver ionosphere-free code bias $_R B_{IF}$ may be considered a nuisance parameter and be naturally absorbed into the receiver clock error $_R \tau$. In addition, the PPP corrections for the satellite clocks inherently account for the satellite pseudorange bias terms $^k B_{IF}$ (but not for the receiver-dependent GLONASS channel bias or the system bias between GPS and GLONASS). The receiver carrier phase bias $_R b_{IF}$ may not be easily estimated separately in the float solution and is therefore absorbed into each of the resulting float ambiguity terms. The PPP corrections include additional terms for each satellite that enable compensation of each measurement for satellite carrier phase biases $^k b_{IF}$, which are not constant over time.

In block 304, a recursive estimator (e.g., a Kalman filter) may compute a float solution and corresponding zero-difference ionospheric-free float ambiguity values. The float solution may consist of a state vector X and a covariance matrix P for terms such as position, clock bias, tropospheric delay, and floating ambiguity values. The position of the receiver may be updated at each interval (e.g., epoch) using the recursive estimator in block 304, based on the compensated ionosphere-free measurements from block 303. The float solution from block 304 does not itself involve ambiguity resolution.

The float solution may be determined using simplified ionosphere-free measurement equations. For GPS, such equations are given as:

$$\tilde{P}_{IF} = \vec{e} \cdot \vec{x} + \tau + M({}^k E) T_{wet} + {}^k \epsilon_{\tilde{P}_{IF}} \qquad (11)$$

$$\tilde{\Phi}_{IF} \lambda_{IF} = \vec{e} \cdot \vec{x} + \tau + M({}^k E) T_{wet} + {}^k \mathcal{N}_{IF} \lambda_{NL} + {}^k \epsilon_{\tilde{\Phi}_{IF}} \qquad (12)$$

For GLONASS, such equations are given as:

$$\tilde{P}_{IF} = \vec{e} \cdot \vec{x} + \tau + \Delta \tau_{GLN} + {}^k C_{GLN} + M({}^k E) T_{wet} + {}^k \epsilon_{\tilde{P}_{IF}} \qquad (13)$$

$$\tilde{\Phi}_{IF} \lambda_{IF} = \vec{e} \cdot \vec{x} + \tau + \Delta \tau_{GLN} + M({}^k E) T_{wet} + {}^k \mathcal{N}_{IF} \lambda_{NL} + {}^k \epsilon_{\tilde{\Phi}_{IF}} \qquad (14)$$

In equations (11)-(14), $\vec{x}$ is the receiver position, $^k \vec{x}$ is the position of satellite k, and $\vec{e}$ is the receiver to satellite line-of-sight vector, where $\vec{e} = \vec{r} / \|\vec{r}\|$ and $\vec{r} \stackrel{\text{def}}{=} {}^k \vec{x} - \vec{x}$. Also, $\tau$ is the receiver clock error (relative to GPS) in meters; $T_{wet}$ is the residual zenith tropospheric wet delay; E is the elevation angle from the receiver to the satellite; M(•) is the elevation wet mapping function that maps zenith tropospheric delay to the line-of-sight; $^k \mathcal{N}_{IF}$ is the float ambiguity; $\lambda_{NL}$ is the narrow lane wavelength and is defined as $$\lambda_{NL} \triangleq \frac{c}{(f_1 + f_2)} = \lambda_{IF}(f_1 - f_2);$$

$\Delta \tau_{GLN}$ is a slowly varying term for the system bias between GPS and GLONASS; $^k C_{GLN}$ is the GLONASS ionosphere-free code bias in meters; $^k \epsilon_{\tilde{P}_{IF}}$ is the ionosphere-free pseudorange measurement noise error in meters (including white noise, multipath, and remaining modeling errors); and $^k \epsilon_{\tilde{\Phi}_{IF}}$ is the ionosphere-free carrier measurement noise error in meters (including white noise, multipath, and remaining modeling errors). The narrow lane wavelength $\lambda_{NL}$ is utilized in equations (11)-(14) instead of an ionospheric-free wavelength because the ionospheric-free wavelength is relatively short, which causes difficulties in directly resolving integer ambiguities. Accordingly, the float ambiguity term satisfies:

$$^k \mathcal{N}_{IF} \lambda_{NL} = N_{IF} \lambda_{IF} + {}_R b_{IF}. \qquad (15)$$

The state vector of Kalman filter may consist of the collection of elements: receiver position $\vec{x}$, , receiver clock error $\tau$, system bias $\Delta \tau_{GLN}$, ionosphere-free code bias $^k C_{GLN}$, tropospheric delay T, and float ambiguity $^k \mathcal{N}_{IF}$. The total active states may include three states for the receiver velocity $\dot{\vec{x}}$ and be given by $6+1+1+N_{GLN}+1+(N_{GPS}+N_{GLN})$. There may be a total of $9+N_{GPS}+2N_{GLN}$ active states in the Kalman filter at any time, where $N_{GPS}$ and $N_{GLN}$ represent the number of GPS and GLONASS satellites in view of the receiver, respectively. The number of states may increase by two if tropospheric gradient terms are included.

The Kalman filter may have time update and measurement update operations, as is known in the art. The process noise added to the states may include a small amount of fully correlated noise (e.g., 0.04 cycles² per second) because the receiver phase bias $_R b_{IF}$ has been absorbed into the zero-difference floating ambiguity states.

The state vector X and the covariance matrix P of the Kalman filter can be referred to as the float solution. The purpose of ambiguity determination as described herein is to result in corrections to the float solution (i.e., $\Delta X$, $\Delta P$). The corrected state vector may be given by $X+\Delta X$ with covariance $P-\Delta P$. The corrected state vector may contain an improved estimate of the position, among other things, such as clock bias, tropospheric delay, and floating ambiguity values.

Ambiguity determination may be performed using wide lane and narrow lane measurement combinations, due to the relatively small ionosphere-free wavelength $\lambda_{IF}$, e.g., approximately 0.6 cm for GPS. The wide lane ambiguities may be determined in block 305 and the narrow lane ambiguities may be determined in block 306. The wide lane wavelength may be given by:

$$\lambda_{WL} \triangleq \frac{c}{(f_1 - f_2)} \quad (16)$$

and the narrow lane wavelength may be given by:

$$\lambda_{NL} \triangleq \frac{c}{(f_1 + f_2)}. \quad (17)$$

Accordingly, the wide lane wavelength may be approximately 86.2 cm for GPS and 84.2 cm for GLONASS, and the narrow lane wavelength may be approximately 10.7 cm for GPS and 10.5 cm for GLONASS.

The wide lane ambiguity $N_{WL}$ is defined as:

$$N_{WL} \triangleq N_1 - N_2 \quad (18)$$

and may be determined first, and the narrow lane ambiguity $N_{NL}$ may be determined based on the wide lane ambiguity $N_{WL}$. In particular, because:

$$\lambda_{IF} N_{IF} = \lambda_{NL} \frac{1}{(f_1 - f_2)} N_{IF} = \lambda_{NL} \left( \frac{f_1}{(f_1 - f_2)} N_1 - \frac{f_2}{(f_1 - f_2)} N_2 \right), \quad (19)$$

the narrow lane ambiguity (i.e., any one of $N_1$, $N_2$, or $N_{NL}$) can be found using one of the following relationships:

$$\lambda_{IF} N_{IF} = \lambda_{NL} N_1 - \lambda_{NL} \frac{f_2}{(f_1 - f_2)} N_{WL} \quad (20)$$

$$\lambda_{IF} N_{IF} = \lambda_{NL} N_2 + \lambda_{NL} \frac{f_1}{(f_1 - f_2)} N_{WL} \quad (21)$$

$$\lambda_{IF} N_{IF} = \lambda_{NL} \frac{N_{NL}}{2} + \lambda_{WL} \frac{N_{WL}}{2}, N_{NL} \stackrel{def}{=} N_1 + N_2. \quad (22)$$

Accordingly, once the wide lane ambiguity $N_{WL}$ is determined, equations (20)-(22) may be utilized to find an expression to determine a narrow lane ambiguity. For example, using $N_2$ as the narrow lane ambiguity, $N_2$ can be found by rewriting equation (21) as:

$$\lambda_{NL} N_2 = \lambda_{IF} N_{IF} - \lambda_{NL} \frac{f_1}{(f_1 - f_2)} N_{WL}. \quad (23)$$

Because the narrow lane wavelengths $\lambda_{NL}$ are much longer than the ionosphere-free wavelengths $\lambda_{IF}$, ambiguity resolution is more easily performed. It should be noted that equations (20) and (22) could also be rewritten to find $N_1$ or $N_{NL}$ as the narrow lane ambiguity. Without loss of generality, in the description that follows, $N_2$ is used as the narrow lane ambiguity. For simplicity and clarity, the subscript "NL" is used for the narrow lane ambiguity.

Accordingly, at block 305, the between-satellite single-difference wide lane ambiguities $N_{WL}$ may be resolved using the Melbourne-Wubbena combination. The Melbourne-Wubbena combination is a geometry-free, ionospheric-free linear combination of phase and code measurements from a single receiver, and is given as:

$$\lambda_{WL} MW \triangleq \lambda_{WL}(\Phi_1 - \Phi_2) - \left( \frac{f_1}{(f_1 + f_2)} P_1 + \frac{f_2}{(f_1 + f_2)} P_2 \right), \quad (24)$$

and can be written for GPS as:

$$\lambda_{WL} MW = \lambda_{WL} N_{WL} + {}^k B_{WL} + {}_R B_{WL} + \epsilon_{WL}, \quad (25)$$

and written for GLONASS as:

$$\lambda_{WL} MW = \lambda_{WL} N_{WL} + {}^k B_{WL} + {}_R B_{WL} + {}^k IFB_{WL} + \epsilon_{WL}, \quad (26)$$

where ${}^k B_{WL}$, and ${}_R B_{WL}$, are the satellite and receiver wide lane biases, respectively, that are a collection of the original biases with various scaling factors. The term ${}^k IFB_{WL}$ represents the inter-frequency bias term that models the effect of GLONASS code channel biases on the wide lane measurement combination. The inter-frequency bias may vary from receiver to receiver, and may also vary in different installations (e.g., due to varying antenna and cabling setups). The magnitude of the inter-frequency bias is typically less than 0.1 cycles per frequency number difference. It can be assumed that the GLONASS code bias-related terms can be accurately modeled by a term that is linear in the GLONASS frequency number. As such, the inter-frequency bias ${}^k IFB_{WL}$, may be approximately equal to $K*{}^k n$, where ${}^k n \in \{-7, 6, \ldots, 6\}$ and K is an unknown slowly varying coefficient for a given receiver.

In block 305, undifferenced Melbourne-Wubbena measurements may be used to estimate one wide lane ambiguity state per visible satellite. Typically, the wide lane satellite biases ${}^k B_{WL}$ are broadcast in real-time within correction data and can be used for measurement compensation. The receiver wide lane biases ${}_R B_{WL}$ may be lumped into the float wide lane ambiguity state $\mathcal{N}_{WL}$. Accordingly, the float wide lane ambiguity state $\mathcal{N}_{WL}$, is no longer an integer. However, the between-satellite single-differences ${}^{k,m}\nabla \mathcal{N}_{WL}$ for GPS are integers and can be resolved in their single-difference form. For GLONASS, it is necessary to remove the inter-frequency bias contribution from the single-difference form in order to recover the integer.

Because the float ambiguity states contain the wide lane ambiguity and the receiver bias, some amount of fully correlated process noise is typically applied in the dynamic update of the Kalman filter. The single differential wide-lane ambiguity and the variance-covariance can be derived based on the undifferenced float ambiguity states and variance-covariance in block 305 after a reference satellite for each constellation is chosen. A standard ambiguity resolution process can be applied for single-difference ambiguities ${}^{k,m}\nabla \mathcal{N}_{WL}$. Techniques for solving this type of ambiguity resolution are known in the art. Ambiguity resolution validation may also be performed in block 305. After ambiguity resolution validation is performed, a single-difference integer ambiguity constraint can be applied to wide lane float estimator.

Narrow lane ambiguities may be determined based on the wide lane ambiguities determined in block 305 and the ionospheric-free float ambiguity values from block 304. Ultimately, single-difference float narrow lane ambiguities may be computed that are used to fix or determine precise ambiguity values. The updated values may then be used to correct the state vector and covariance matrix of the float solution (i.e., compute $\Delta X$, $\Delta P$) in order to update the position of the receiver.

In block 306, initial estimates of the narrow lane ambiguities may be computed. The steps performed in block 306 are shown in the process 306 of FIG. 3. At step 402, subsets of visible satellites may be selected as candidates for processing the narrow lane ambiguities and as a reference satellite for between-satellite single-differencing calculations. The subsets of the visible satellites may be selected based on measurement residuals from processing the respective ionosphere-free code and carrier measurements in the float Kalman filter (i.e., equations (13) and (14)), float ambiguity covariance for the respective float ambiguity values, PPP correction quality for the given satellites, and wide lane fixing status for the satellites (i.e., fixed or not fixed). For example, when the measurement residuals are high, this indicates possible problems with the associated satellites, and can result in not selecting those satellites and their estimates and/or measurements.

At step 404, it may be determined whether a condition exists for transitioning to the float solution from block 304 as the narrow lane ambiguity values. The conditions at step 404 may include whether the age of the PPP corrections is above a certain threshold (e.g., three minutes), whether there are not enough satellites available as candidates, and whether a suitable reference satellite is available. If such a condition exists at step 404, then the process 306 continues to step 410 to transition to the float solution.

Transitioning to the float solution at step 410 may be performed to ensure that the transition is relatively smooth and not too rapid. Because the state vector after applying the correction due to ambiguity determination is given by $X+\Delta X$, the difference between the float solution and the solution after ambiguity determination is given by the offset $\Delta X$ and using the float solution is equivalent to setting the offset $\Delta X$ to zero. Therefore, an offset $\Delta X_t$ may be utilized to perform the transition, where the offset $\Delta X_t$ has been stored at a previous interval. Starting at the interval when the transition is begun, the subsequent position change may be limited at each interval by a term related to the offset $\Delta X_t$. In particular, the position change may be limited to not vary by more than a magnitude $\epsilon$ that is a small predetermined value. The transition may be made over N steps, where N is the rounded-off value of $\|\Delta X_t\|/\epsilon$. Accordingly, at step 401, for k=1 . . . N, the float solution can be transitioned to by the end of the transition period, where $$\Delta X_{t+k} = \frac{N-k}{N}\Delta X_t.$$

Figure 3:
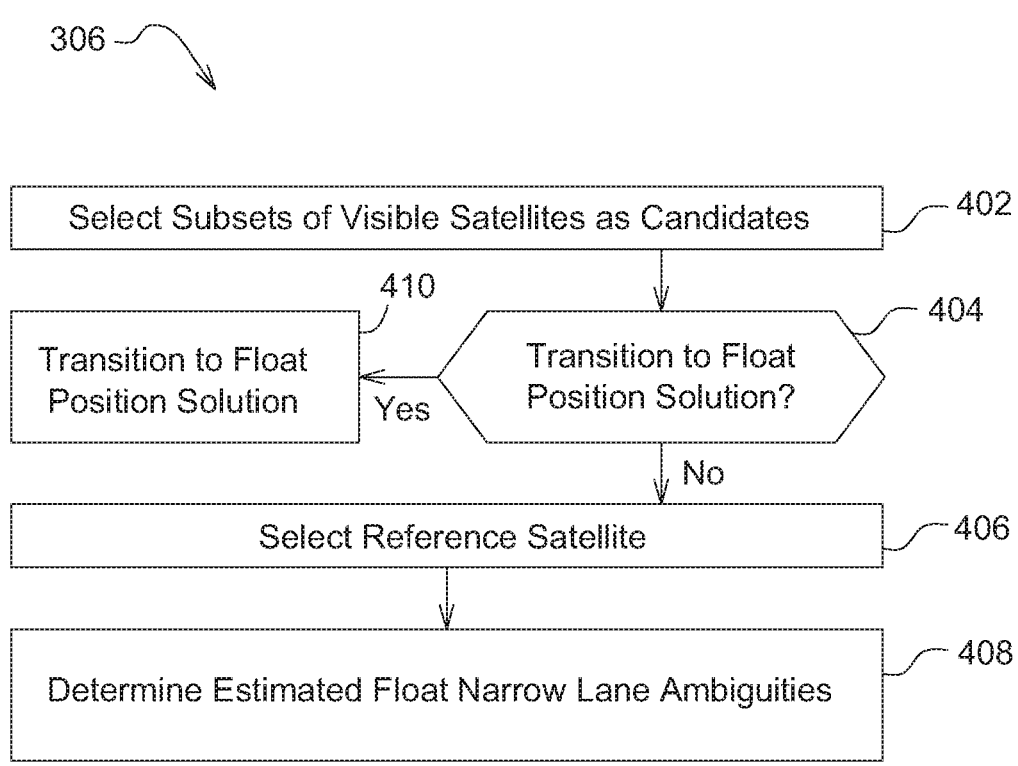
FIG. 3 is a flowchart illustrating operations for determining estimated float narrow lane ambiguities in a satellite navigation receiver, in accordance with some embodiments.

Returning to step 404 in FIG. 3, if a transition condition does not exist, then the process 306 continues to step 406. At step 406, a reference satellite may be selected for each constellation. The selection of the reference satellite may be based on the float ambiguity covariance P and other heuristics, such as considering only the satellites for which wide lane ambiguity values have been determined and favoring the satellites which were used successfully for ambiguity determination in a previous interval. At step 408, estimated float narrow lane ambiguities $^{k,m}\nabla \mathcal{N}_{NL}$ may be determined that are between-satellite single-differences. For each constellation with m denoting the index of the selected reference satellite, the estimated float narrow lane ambiguities $^{k,m}\nabla \mathcal{N}_{NL}$ may be given by:

$$^{k,m}\nabla \mathcal{N}_{NL} \triangleq {}^{k,m}\nabla \mathcal{N}_{IF} - \frac{f_1}{f_1-f_2} {}^{k,m}\nabla \mathcal{N}_{WL}. \qquad (27)$$

The estimated float narrow lane ambiguities $^{k,m}\nabla \mathcal{N}_{NL}$ may be considered as noisy measurements of the integers $^{k,m}\nabla N_{NL}$.

Returning to FIG. 2, a modified BIE algorithm may be performed at block 307 to calculate the best estimate for narrow lane single-difference ambiguities $^{k,m}\nabla \mathcal{N}_{NL,BIE}$, based on the estimated float narrow lane ambiguities $^{k,m}\mathcal{N}_{NL}$ and the corresponding covariance matrix $Q_{NL}$. Generally, these modified BIE single differences are non-integer. The modified BIE algorithm may be based on the LAMBDA technique to solve an integer least squares problem, which can optionally use a Z-transform and a reverse Z-transform. The model used by in block 307 may be written as:

$$z = H_N N + H_\xi \xi + \eta_z, \qquad (28)$$

where z is the measurement vector, N is the integer ambiguity vector, $\xi$ is the vector of real-valued parameters, $\eta_z$ is measurement noise, $N \in \mathbb{Z}^q$, $\xi \in \mathbb{R}_p$ with $H_N$ and $H_\xi$ being the corresponding design matrices and the noise assumed to be zero-mean normally distributed. The float solution after a least-squares adjustment may be given as:

$$\begin{pmatrix} \hat{N} \\ \hat{\xi} \end{pmatrix}, \begin{pmatrix} Q_{\hat{N}\hat{N}} & Q_{\hat{N}\hat{\xi}} \\ Q_{\hat{\xi}\hat{N}} & Q_{\hat{\xi}\hat{\xi}} \end{pmatrix}. \qquad (29)$$

The BIE solution may be given by:

$$\mathcal{N}_{BIE} = \frac{\sum_{z \in \mathbb{Z}^q} z w(z)}{\sum_{z \in \mathbb{Z}^q} w(z)} \qquad (30)$$

$$\chi_z^2 \stackrel{def}{=} \|\hat{N} - z\|^2_{Q_{\hat{N}\hat{N}}^{-1}} \qquad (31)$$

$$w(z) = \qquad (32)$$
$$\exp\left(-\frac{(\hat{N}-z)Q_{\hat{N}\hat{N}}^{-1}(\hat{N}-z)}{2}\right) = \exp\left(-\frac{\|\hat{N}-z\|^2_{Q_{\hat{N}\hat{N}}^{-1}}}{2}\right) = \exp\left(-\frac{\chi_z^2}{2}\right)$$

$$\Delta \xi_{BIE} \stackrel{def}{=} Q_{\hat{\xi}\hat{N}} Q_{\hat{N}\hat{N}}^{-1} (\hat{N} - \mathcal{N}_{BIE}) \qquad (33)$$

$$\Delta Q_{BIE} \stackrel{def}{=} Q_{\hat{\xi}\hat{N}} Q_{\hat{N}\hat{N}}^{-1} Q_{\hat{N}\hat{\xi}} \qquad (34)$$

$$\xi_{BIE} = \hat{\xi} + \Delta \xi_{BIE} \qquad (35)$$

$$Q_{\xi_{BIE}\xi_{BIE}} = Q_{\hat{\xi}\hat{\xi}} - \Delta Q_{BIE} \qquad (36)$$

$$\chi^2_{BIE} = \frac{\sum_{z \in \mathbb{Z}^q} \chi_z^2 \cdot w(z)}{\sum_{z \in \mathbb{Z}^q} w(z)}. \qquad (37)$$

Figure 4:
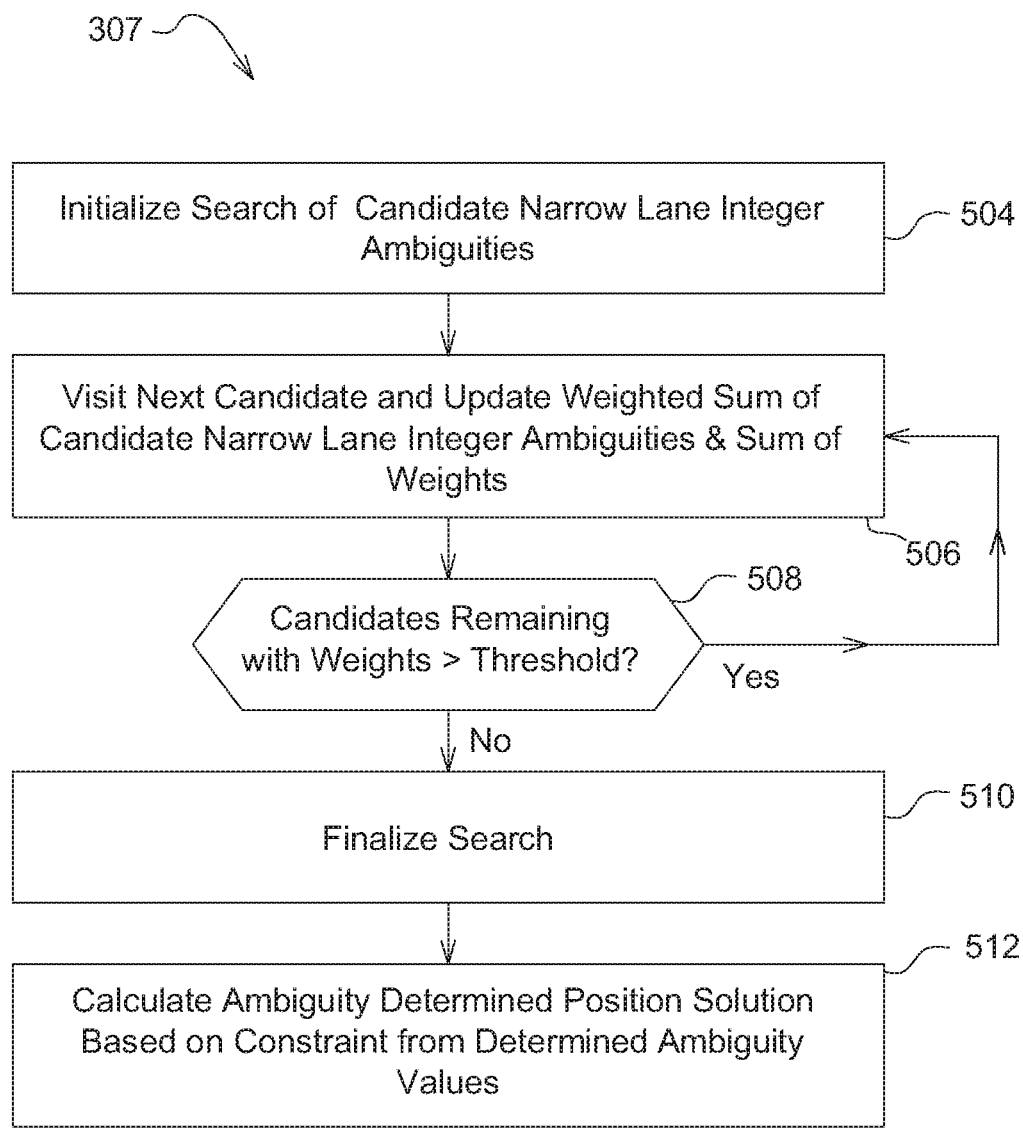
FIG. 4 is a flowchart illustrating operations for calculating an ambiguity determined position solution using a modified best integer equivariant process in a satellite navigation receiver, in accordance with some embodiments.

The steps performed in block 307 are shown in the process 307 of FIG. 4. At step 504, a tree search of the candidate narrow lane integer ambiguities $^{k,m}\nabla N_{NL}$ may be initialized, such as by computing a Z-transform, for example. The nodes in the search tree are integer vectors. During this search, at step 506, the next candidate narrow lane integer ambiguity $^{k,m}\nabla N_{NL}$ may be visited in the tree and weighted sums $\tau z \cdot w(z)$ of the candidate narrow lane integer ambiguities $^{k,m}\nabla N_{NL}$ and a sum of weights $\Sigma w(z)$ may be updated. By updating both the sum of weights $\Sigma w(z)$ and the weighted sum $\tau z \cdot w(z)$ during the search, there is no need to store a large number of candidates or utilize thresholds to control the number of candidates.

The weighting at step 506 may be adaptively scaled so that a large dynamic range in weight magnitudes of the candidates is avoided. For a given choice of $\chi_0^2$, scaled weights can be defined as $$w_0(z) \stackrel{def}{=} \exp\left(-\frac{\chi_z^2}{2} + \frac{\chi_0^2}{2}\right).$$

Presuming that for any $\chi_0^2 \in \mathbb{R}$ the ambiguity determined position solution $\mathcal{N}_{BIE}$ can be written as:

$$\mathcal{N}_{BIE} = \frac{\Sigma z \cdot w(z)}{\Sigma w(z)} = \frac{\Sigma z \cdot \exp\left(-\frac{\chi_z^2}{2}\right)}{\sum \exp\left(-\frac{\chi_z^2}{2}\right)} = \tag{38}$$

$$\frac{\exp\left(\frac{\chi_0^2}{2}\right)\Sigma z \cdot \exp\left(-\frac{\chi_z^2}{2}\right)}{\exp\left(\frac{\chi_0^2}{2}\right)\Sigma \exp\left(-\frac{\chi_z^2}{2}\right)} = \frac{\Sigma z \cdot \exp\left(-\frac{\chi_z^2}{2} + \frac{\chi_0^2}{2}\right)}{\Sigma \exp\left(-\frac{\chi_z^2}{2} + \frac{\chi_0^2}{2}\right)},$$

and therefore as:

$$\mathcal{N}_{BIE} = \frac{\Sigma z \cdot w_0(z)}{\Sigma w_0(z)}. \tag{39}$$

The choice of $\chi_0^2$ may be dynamically changed during the search to be the minimum $\chi_0^2$ of all the candidates that have been visited during the search at that point. For each candidate visited during the search, partial sums of the numerator and denominator terms of equation (29) can therefore be accumulated.

In addition, because the sum of weights $\Sigma w(z)$ and the weighted sum $\tau z \cdot w(z)$ are generated during the search, only the candidates with large enough weights to have a significant numerical impact may be included. For example, if $z_1$ represents the best solution (i.e., where $\chi_1^2$ is a minimum) found so far in a search with $w(z_1)$ as its corresponding weight, and $z_c$ is an integer vector candidate at a current node of the search with a corresponding weight $w(z_c)$, then the candidate $z_c$ can be considered not significant when $w(z_c) \ll w(z_1)$. Candidates may be included during the search as long as:

$$w(z_c) \geq \varepsilon w(z_1), \tag{40}$$

where $\varepsilon$ is a small threshold, such as $10^{-6}$.

This is equivalent to:

$$\chi_c^2 \leq \chi_1^2 + \ln\frac{1}{\varepsilon^2}. \tag{41}$$

During the search, at step 508, determined ambiguity values $^{k,m}\nabla \mathcal{N}_{NL,BIE}$ can be formed based on the weighted sums of the candidate narrow lane integer ambiguities and the sum of weights. It can also be determined at step 508 whether there are candidates remaining with weights greater than a predetermined threshold. If there are still candidates remaining at step 508, then the process 307 may return to step 506 to continue the search and repeat step 506 on the next candidate. If there are no candidates remaining at step 508, then the process 307 may continue to step 510 to finalize the search, such as by applying a reverse Z-transform, for example. The determined ambiguity values $^{k,m}\nabla \mathcal{N}_{NL,BIE}$ may be utilized to form a constraint that can be applied to the float solution in order to calculate an ambiguity determined position solution ($\Delta X_{BIE}, \Delta P_{BIE}$) at step 512.

Figure 5:
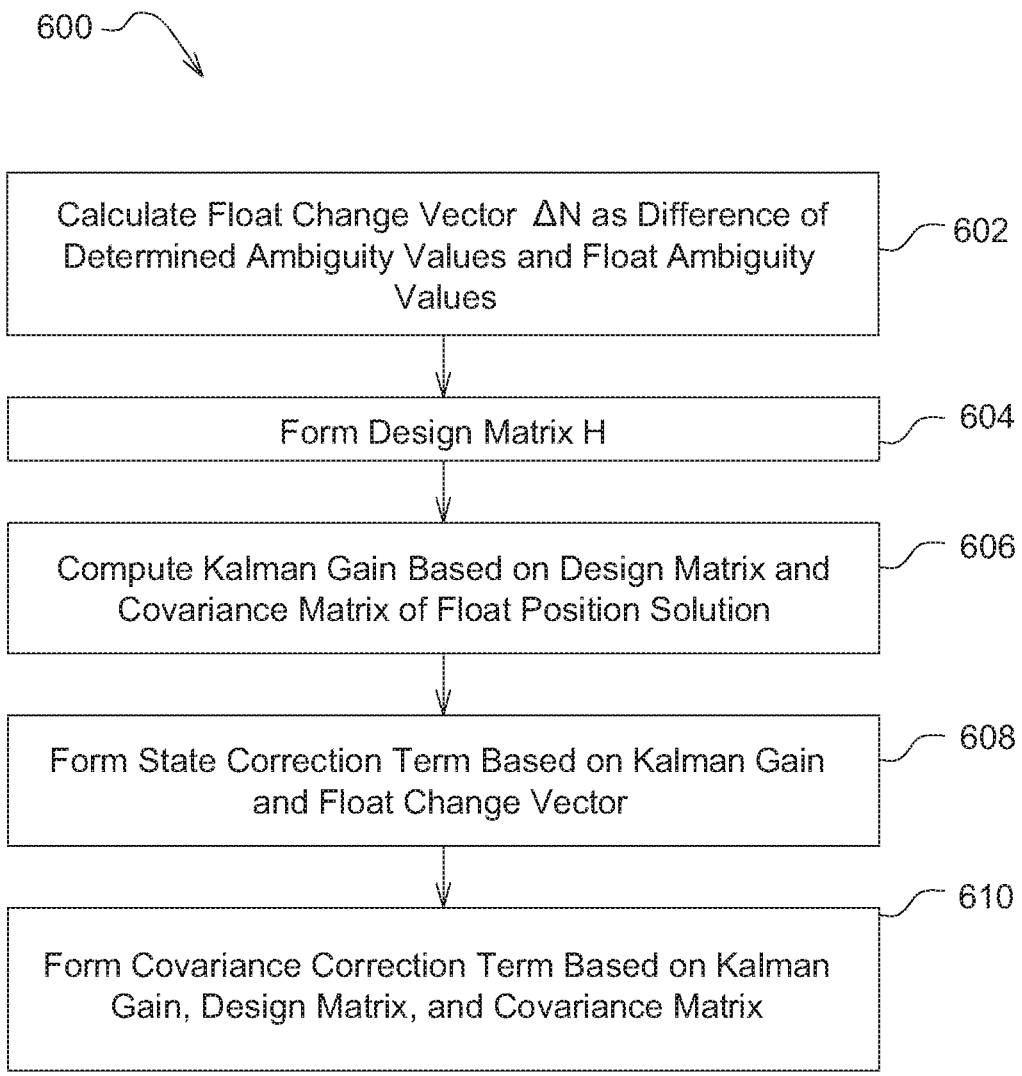
FIG. 5 is a flowchart illustrating operations for computing corrections to a state vector and a covariance matrix of a float solution in a satellite navigation receiver, in accordance with some embodiments.

The steps performed in step 512 are shown in the process 600 of FIG. 5. At step 602, a float change vector $\Delta N$ may be calculated as the difference of the determined ambiguity values $^{k,m}\nabla \mathcal{N}_{NL,BIE}$ (calculated at step 510) and the float ambiguity values $^{k,m}\nabla \mathcal{N}_{NL,BIE}$. Accordingly, the float change vector $\Delta N$ may have elements consisting of $^{k,m}\nabla \mathcal{N}_{NL,BIE} - ^{k,m}\nabla \mathcal{N}_{NL}$. At step 604, a design matrix H may be formed. The design matrix H may have the same row dimensions as the float change vector $\Delta N$ and a column dimension equal to the state size of the float state vector X. Accordingly, each row of the design matrix H may have a +1 coefficient at the state index of $^k\mathcal{N}_{IF}$ and a −1 coefficient at the state index of $^m\mathcal{N}_{IF}$, where m is the reference satellite for k.

At step 606, the Kalman gain K may be computed based on the design matrix H and the covariance matrix P of the Kalman filter, as given by:

$$K = PH^T(HPH^T)^{-1}. \tag{42}$$

Correction terms may be formed at steps 608 and 610. In particular, at step 608, a state correction term $\Delta X_{BIE} = K\Delta N$, and at step 610 a covariance correction term $\Delta P_{BIE} = KHP$. The state correction term $\Delta X_{BIE}$ and the covariance correction term $\Delta P_{BIE}$ may form the ambiguity determined position solution. The state vector can be corrected by adding the state correction term $\Delta X_{BIE}$ (i.e., $X + \Delta X_{BIE}$), and the covariance matrix can be corrected by subtracting the covariance correction term $\Delta P_{BIE}$ (i.e., $P - \Delta P_{BIE}$).

Figure 6:
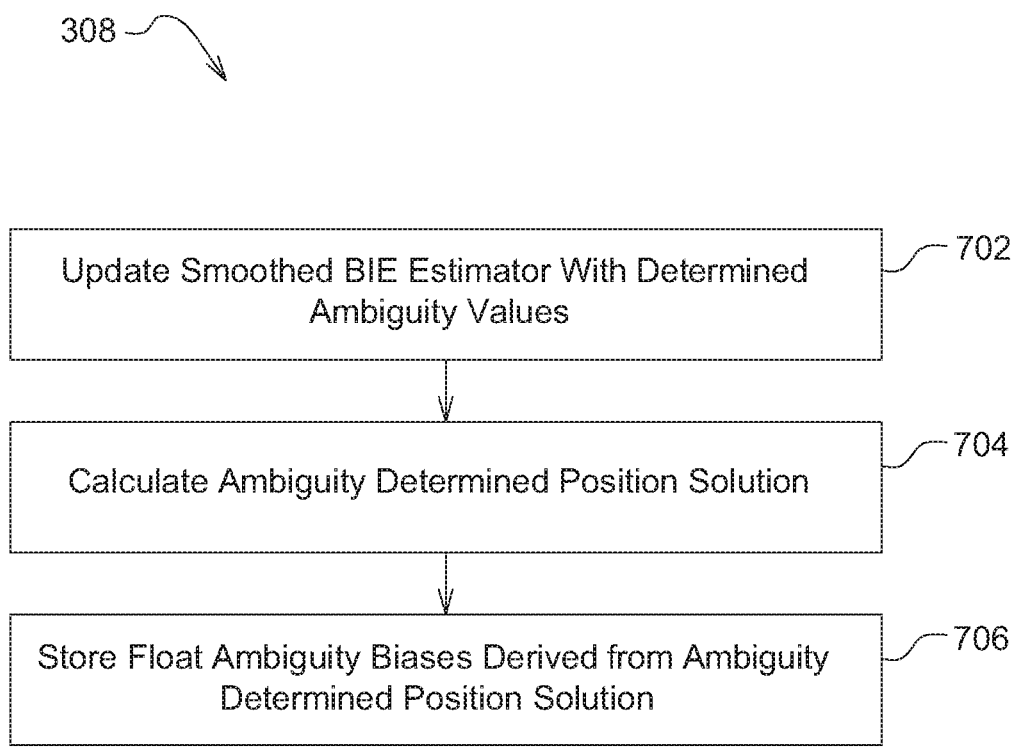
FIG. 6 is a flowchart illustrating operations for generating a smoothed ambiguity determined position solution in a satellite navigation receiver, in accordance with some embodiments.

Returning to FIG. 2, the determined ambiguity values $^{k,m}\nabla \mathcal{N}_{NL,BIE}$ may be time-smoothed at block 308 to generate smoothed ambiguity values $^{k,m}\nabla \mathcal{N}_{NL,SBIE}$. The steps performed in block 308 are shown in the process 308 of FIG. 6. At step 702, a smoothed BIE estimator may be updated with the determined ambiguity values $^{k,m}\nabla \mathcal{N}_{NL,BIE}$ to generate the smoothed ambiguity values $^{k,m}\nabla \mathcal{N}_{NL,SBIE}$. The smoothed ambiguity values $^{k,m}\nabla \mathcal{N}_{NL,SBIE}$ are generally smoothly varying in time, changing gradually from the estimated float narrow lane ambiguities $^{k,m}\nabla \mathcal{N}_{NL}$ to the determined ambiguity values $^{k,m}\nabla \mathcal{N}_{NL,SBIE}$.

Figure 7:
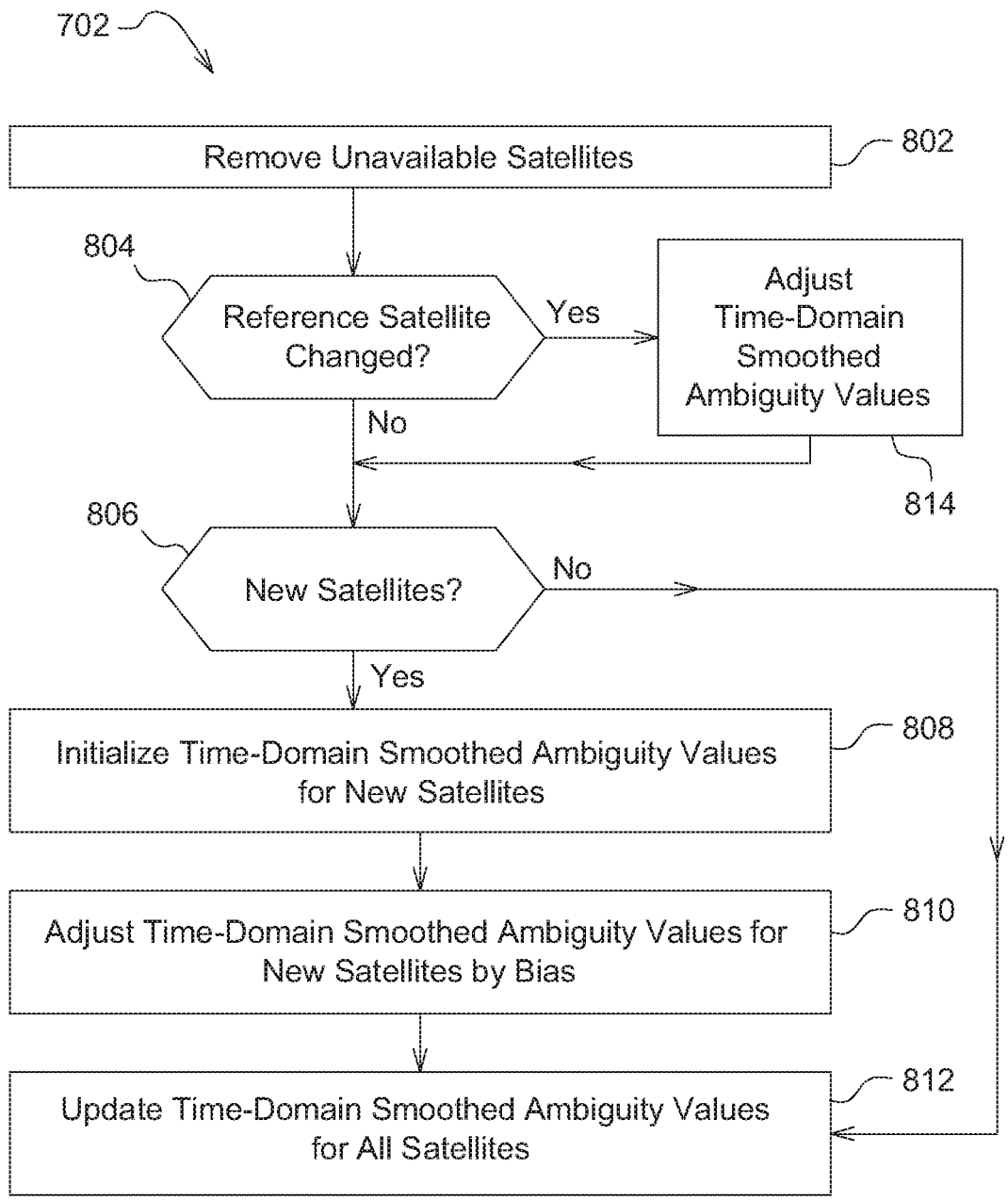
FIG. 7 is a flowchart illustrating operations for updating smoothed ambiguity values in a satellite navigation receiver, in accordance with some embodiments.

The steps performed at step 702 are shown in the process 702 of FIG. 7. The following terms and notation are used in the discussed on the process 702. In particular, $^k\mathcal{N}_{NL}$ represents the float narrow lane value for a satellite k in cycles; $^k\mathcal{N}_{NL,BIE}$ represents the ambiguity determined narrow lane value for a satellite k in cycles; $^k\mathcal{N}_{NL,SBIE}$ represents the smoothed ambiguity determined narrow lane value for a satellite k in cycles; $^k\Delta\mathcal{N}_{NL,BIAS}$ represents the narrow lane float bias value for a satellite k in cycles; W represents the window length for smoothing determined narrow lane values and is given as an integer number of intervals (e.g., epochs); and $^kC$ represents a smoothing count for satellite k, is given as an integer number of intervals (e.g., epochs), is initialized to 0, and is incremented by one each interval. In addition, t may denote the current interval and t−1 may denote the previous interval.

At step 802, unavailable satellites may be removed from being used in the time-domain smoothing. An unavailable satellite may include satellites that the receiver can no longer receive signals from. At step 804, it may be determined whether the reference satellite has changed from a previous interval. If the reference satellite has changed at step 804, then the process 702 continues to step 814 to calculate time-domain smoothed ambiguity values for the new reference satellite and satellites other than the removed unavailable satellites. The old reference satellite may be denoted as $m_0$ and the new reference satellite may be denoted as $m_1$. In addition, the difference in integer ambiguities between the new reference satellite $m_1$ and a given satellite k may be given by:

$$^{k,m_1}\nabla N_{NL} = ^{k,m_0}\nabla N_{NL} - ^{m_1 m_0}\nabla N_{NL}. \quad (43)$$

At step 814, if the new reference satellite was not used in a previous interval, then the time-domain smoothed ambiguity values for the old reference satellite $m_0$, the new reference satellite $m_1$, and a given satellite k may be calculated by:

$$^k\mathcal{N}_{NL,SBIE}(t-1) = ^k\mathcal{N}_{NL,SBIE}(t-1) - ^{m_1 m_0}\nabla\mathcal{N}_{NL}(t); k\neq m_0, k\neq m_1 \quad (44)$$

$$^kC(t-1)=0 \quad (45)$$

$$^{m_0}\mathcal{N}_{NL,SBIE}(t-1) = ^{m_1 m_0}\nabla\mathcal{N}_{NL}(t) \quad (46)$$

$$^{m_0}C(t-1)=0 \quad (47)$$

$$^{m_1}\mathcal{N}_{NL,SBIE}(t-1)=0 \quad (48)$$

$$^{m_1}C(t-1)=0. \quad (49)$$

If the new reference satellite $m_1$ was used in a previous interval, then the time-domain smoothed ambiguity values for the old reference satellite $m_0$, the new reference satellite $m_1$, and a given satellite k may be adjusted by:

$$^k\mathcal{N}_{NL,SBIE}(t-1) = ^k\mathcal{N}_{NL,SBIE}(t-1) - ^{m_1}\mathcal{N}_{NL,SBIE}(t-1);\ k\neq m_0, k\neq m_1 \quad (50)$$

$$^kC(t-1)=\min(^kC(t-1),^{m_1}C(t-1)) \quad (51)$$

$$^{m_0}C(t-1)=\min(^{m_0}C(t-1),^{m_1}C(t-1)) \quad (52)$$

$$^{m_1}\mathcal{N}_{NL,SBIE}(t-1)=0 \quad (53)$$

$$^{m_1}C(t-1) \text{ is unchanged}. \quad (54)$$

Following step 814 or if the reference satellite has not changed at step 804, then the process 702 continues to step 806. At step 806, it may be determined whether new satellites should be used in the time-domain smoothing. New satellites may include the satellites which were not used in utilized in a previous interval. If it is determined that no new satellites should be used at step 806, then the process 702 continues to step 812, as described below. However, if it is determined that new satellites should be used at step 806, then the process 702 continues to step 808. At step 808, time-domain smoothed ambiguity values $^{k,m}\nabla\mathcal{N}_{NL,BIE}$ may be calculated for the new satellites k having a reference satellite m (where k≠m), as given by:

$$^k\mathcal{N}_{NL,SBIE}(t-1) = ^{k,m}\nabla\mathcal{N}_{NL,BIE}(t) \quad (55)$$

$$^kC(t-1)=0. \quad (56)$$

Following step 808, the time-domain smoothed ambiguity values for the new satellites may be adjusted at step 810 by a bias between the estimated float narrow lane ambiguities $^{k,m}\mathcal{N}_{NL}$ and time-domain smoothed ambiguity values $^{k,m}\nabla\mathcal{N}_{NL,BIE}$ from a previous interval. By adjusting with the bias, the initial bias may be minimized between the estimated float narrow lane ambiguities $^{k,m}\mathcal{N}_{NL}$ and time-domain smoothed ambiguity values $^{k,m}\nabla\mathcal{N}_{NL,BIE}$ from the previous interval. This may be calculated by:

$$^k\mathcal{N}_{NL,SBIE}(t-1) = ^k\mathcal{N}_{NL,SBIE}(t-1) + ^{k,m}\nabla\Delta\mathcal{N}_{NL,BIAS}(t-1), \quad (57)$$

where $$^{k,j}\nabla\Delta N_{NL,BIAS}(t) \stackrel{def}{=} ^k\Delta\mathcal{N}_{NL,BIAS}(t) - ^j\Delta\mathcal{N}_{NL,BIAS}(t). \quad (58)$$

The term $^k\Delta\mathcal{N}_{NL,BIAS}$ in equation (58) represents the respective undifferenced float ambiguity entries in the state vector increment $\Delta X_{SBIE}$ of the ambiguity determined position solution from the prior interval.

At step 812, the time-domain smoothed ambiguity values for all of the satellites may be updated based on the determined ambiguity values $^{k,m}\nabla\mathcal{N}_{NL,BIE}$. Step 812 may be performed following step 810 or if no new satellites were determined to be needed at step 806. In some embodiments, an exponential filter such as a recursive estimator may be utilized but in other embodiments, other techniques for smoothing may be utilized. The update of the time-domain smoothed ambiguity values $^{k,m}\nabla\mathcal{N}_{NL,SBIE}$ may be performed according to the following for each satellite k:

$$^k\mathcal{N}'_{NL,SBIE}(t) = \frac{W-1}{W}(^k\mathcal{N}'_{NL,SBIE}(t-1)) + \frac{1}{W}(^k\mathcal{N}'_{NL,BIE}(t)) \quad (59)$$

$$^kC(t) = ^kC(t-1) + 1 \quad (60)$$

$$^k\sigma^2_{NL,SBIE}(t) = \frac{1}{^kC(t)}(^k\mathcal{N}'_{NL,SBIE}(t) - ^k\mathcal{N}'_{NL,BIE}(t))^2. \quad (61)$$

Following step 702, an ambiguity determined position solution $(\Delta X_{SBIE}, \Delta P_{SBIE})$ may be calculated at step 704 based on the smoothed ambiguity values $^{k,m}\nabla\mathcal{N}_{NL,SBIE}$. Step 704 may include the steps described above with relation to the process 600 of FIG. 5, and may also correspond to block 309 of FIG. 2. One difference is at step 606 where the Kalman gain K is computed. In the case of using the smoothed ambiguity values $^{k,m}\nabla\mathcal{N}_{NL,SBIE}$, the Kalman gain K includes uncertainty in the constraint, and is given by:

$$K = PH^T(HPH^T+R)^{-1} \quad (62)$$

where the covariance matrix $R=\text{diag}(\text{var}(0.7\,\mathcal{N}_{BIE}))$ is computed as a function of the weights used in the search performed at block 307 of FIG. 2. At step 706, float ambiguity biases may be stored that are derived from the ambiguity determined position solution $(\Delta X_{SBIE}, \Delta P_{SBIE})$ from step 704. The float ambiguity biases are used as described above with relation to step 810 of the process 702 of FIG. 7.

Returning to FIG. 2, following block 309, a final position solution may be computed using block 350. Block 350 may include several steps, as shown in the process 350 of FIG. 8. It should be noted that the weighting process described below may also be applied to the ambiguity determined position solution ($\Delta X_{BIE}, \Delta P_{BIE}$) from block 307, in some embodiments. At step 902 (embodied in block 310), the ambiguity determined position solution ($\Delta X_{SBIE}, \Delta P_{SBIE}$) from block 309 may be blended with the float solution from block 304 to form a weighted smoothed ambiguity determined position solution ($\Delta X_{WSBIE}, \Delta P_{WSBIE}$). In particular, a time-weighted weighting factor IT may be determined, where $0 \le \overline{w} \le 1$. The weighted smoothed ambiguity determined position solution ($\Delta X_{WSBIE}, \Delta P_{WSBIE}$) may be computed from the ambiguity determined position solution ($\Delta X_{SBIE}, \Delta P_{SBIE}$) as follows:

$$\Delta X_{WSBIE} = \overline{w} \Delta X_{SBIE} \tag{63}$$

$$\Delta P_{WSBIE} = \overline{w}^2 \Delta X_{SBIE}. \tag{63}$$

As can be seen from equations (53) and (54), when $\overline{w}=0$, the float solution will be utilized and when $\overline{w}=1$, the ambiguity determined position solution ($\Delta X_{SBIE}, \Delta P_{SBIE}$) will be utilized. A larger weighting factor IT is used when the confidence in the correctness of the ambiguity determined position solution ($\Delta X_{SBIE}, \Delta P_{SBIE}$) increases.

The weighting may be determined based on one or more factors. The factors may include a minimum variance solution, an acceptability factor a that indicates whether the ambiguity determined position solution ($\Delta X_{SBIE}, \Delta P_{SBIE}$) is acceptable, a convergence indicator of the float solution, and/or a look-up table that is indexed by ranges of corresponding error variances and corresponding figures of merit of the float solution and the ambiguity determined position solution ($\Delta X_{SBIE}, \Delta P_{SBIE}$).

The minimum variance solution factor may minimize an error variance g of a combination of the float solution and the ambiguity determined position solution ($\Delta X_{SBIE}, \Delta P_{SBIE}$). The error variances may be three dimensional position variances that are computed as a trace of the corresponding three dimensional position covariance matrix. The error variance of the float solution may be denoted as $\sigma_{FLOAT}^2$ and the error variance of the ambiguity determined position solution ($\Delta X_{SBIE}, \Delta P_{SBIE}$) may be denoted as $\sigma_{SBIE}^2$. The minimum variance weighting between the float solution and the ambiguity determined position solution ($\Delta X_{SBIE}, \Delta P_{SBIE}$) may be given by:

$$\Delta X = g \Delta X_{SBIE}, \tag{65}$$

where $$g \triangleq \frac{0/\sigma_{FLOAT}^2 + 1/\sigma_{SBIE}^2}{1/\sigma_{FLOAT}^2 + 1/\sigma_{SBIE}^2} = \frac{\sigma_{FLOAT}^2}{\sigma_{SBIE}^2 + \sigma_{FLOAT}^2} = \frac{1}{(\sigma_{SBIE}^2/\sigma_{FLOAT}^2) + 1}. \tag{66}$$

The error variance g will be limited according to $0 \le \overline{g} \le 1$, and will have a small value when the uncertainty of the ambiguity determined position solution ($\Delta X_{SBIE}, \Delta P_{SBIE}$) is large, and conversely will have a large value when the uncertainty of the float solution is relatively large. In some embodiments, a time-filtered version g of the error variance g may be utilized due to noise.

The acceptability factor may indicate whether the ambiguity determined position solution ($\Delta X_{SBIE}, \Delta P_{SBIE}$) is acceptable and be limited according to $0 \le \alpha \le 1$. The acceptability factor a may be smaller when the ambiguity determined position solution ($\Delta X_{SBIE}, \Delta P_{SBIE}$) is unacceptable and may be larger when it is acceptable. The acceptability factor a may be dependent on a quality of the ambiguity determined position solution ($\Delta X_{SBIE}, \Delta P_{SBIE}$), such as based on the magnitude of the quadratic form of the ambiguity determined position solution ($\Delta X_{SBIE}, \Delta P_{SBIE}$) and the ratio test. The ratio test can be defined as the ratio of the quadratic form of the second best solution to the best solution. When the ratio is large, it can indicate that the best solution is the correct solution.

The quadratic form of the ambiguity determined position solution ($\Delta X_{SBIE}, \Delta P_{SBIE}$) may be very large if there are problems with determining ambiguity values. In this case, the acceptability factor a may be 0. However, if the ratio test is large and the quadratic form is small, then the ambiguity determined position solution ($\Delta X_{SBIE}, \Delta P_{SBIE}$) may be deemed more reliable and have an acceptability factor a of 1. In between these cases, the acceptability factor a may by found by a smooth function which decreases from 1 to 0 as the ratio decreases and the quadratic form increases.

The convergence indicator factor may indicate whether the float solution has reached a steady state. In this case, the convergence indicator may be greater when the float solution has reached a steady state or is close to a steady state, and conversely may be less in other situations.

In embodiments, the weighting factor $\overline{w}$ may be chosen based on a combination of these factors. For example, if the acceptability factor $a < 1$ or the float solution has converged and the ambiguity determined position solution ($\Delta X_{SBIE}, \Delta P_{SBIE}$) is determined to be not trustworthy, then the weighting factor IT may be equal to $a\overline{g}$. In other cases, the weighting factor $\overline{w}$ may be equal to the acceptability factor $\alpha$.

Figure 8:
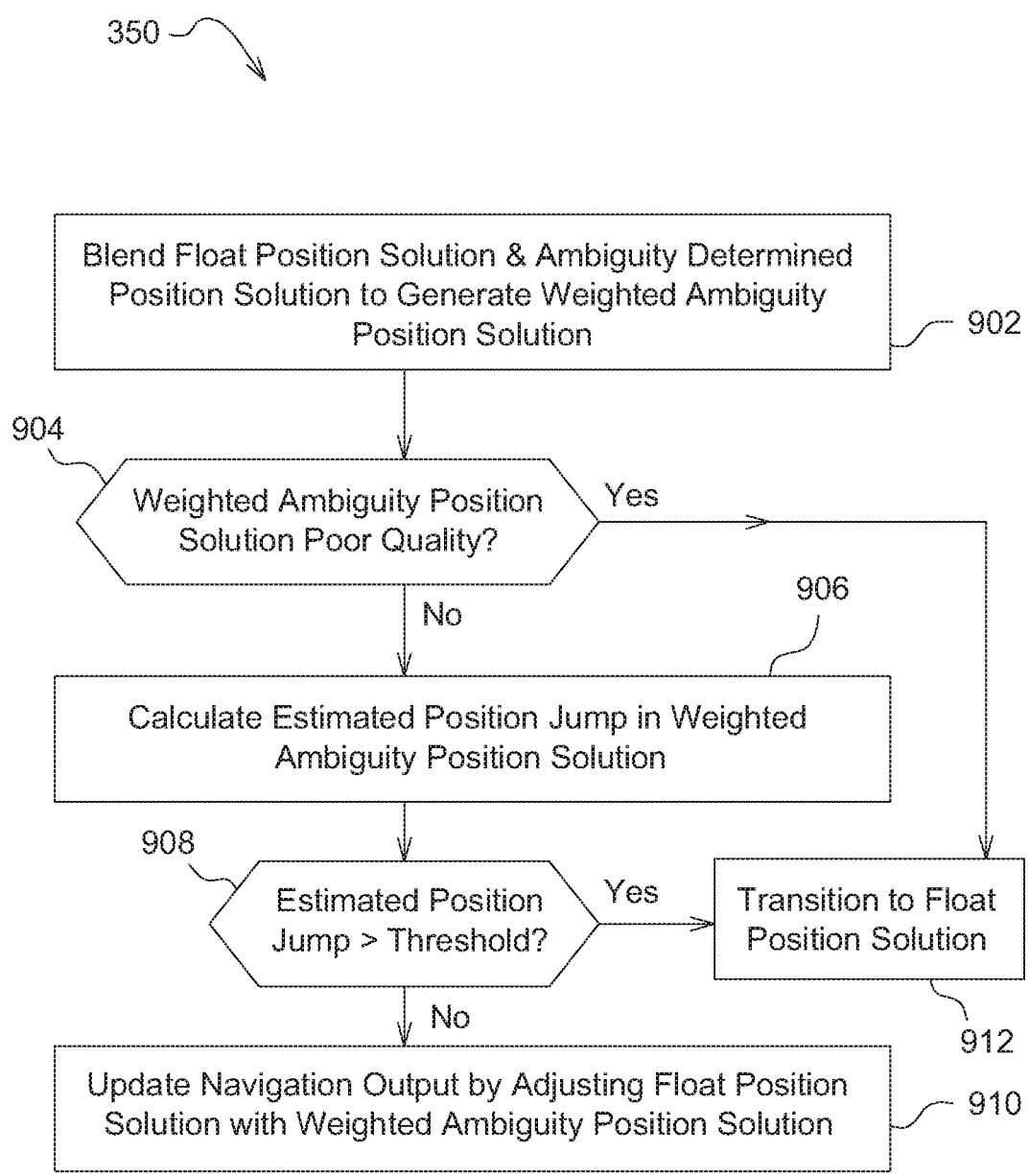
FIG. 8 is a flowchart illustrating operations for weighting an ambiguity determined position solution in a satellite navigation receiver, in accordance with some embodiments.

Returning to the process 350 of FIG. 8, it may be determined at step 904 if the weighted smoothed ambiguity determined position solution ($\Delta X_{WSBIE}, \Delta P_{WSBIE}$) has a poor quality. If the weighted smoothed ambiguity determined position solution ($\Delta X_{WSBIE}, \Delta P_{WSBIE}$) has a poor quality, then the process 350 may continue to step 912 to transition to the float solution. However, if the weighted smoothed ambiguity determined position solution ($\Delta X_{WSBIE}, \Delta P_{WSBIE}$) does not have a poor quality then the process 350 may continue to step 906 (also embodied by block 311).

At step 906, an estimated position jump in the weighted smoothed ambiguity determined position solution ($\Delta X_{WSBIE}, \Delta P_{WSBIE}$) may be calculated. The estimated position jump may be calculated by comparing the change in position since the last interval to the change according to an estimate using the integrated carrier phase that infers positions between the intervals using carrier phase time differences, as is known in the art. At step 908, it may be determined whether the estimated position jump from step 906 is greater than a predetermined threshold. If the estimated position jump is greater than the threshold, then the process 350 may continue to step 912 to transition to the float solution. However, if the estimated position jump is not greater than the threshold, then the process 350 may continue to step 910.

At step 910, the navigation output showing the position of the receiver may be updated at block 312 by adjusting the float solution from block 304 with the weighted smoothed ambiguity determined position solution ($\Delta X_{WSBIE}, \Delta P_{WSBIE}$). The state vector can be corrected by adding the state correction term $\Delta X_{WSBIE}$ (i.e., $X + \Delta X_{WSBIE}$), and the covariance matrix can be corrected by subtracting the covariance correction term $\Delta P_{WSBIE}$ (i.e., $P - \Delta P_{WSBIE}$).

Transitioning to the float solution at step 912 may be performed to ensure that the transition is relatively smooth and not too rapid. At each interval, an offset $\Delta X_{WSBIE}$ is typically stored. The offset can be denoted as $\Delta X_t$ at a subsequent interval when the decision to transition to the float solution is made. Accordingly, at a time t, the transition may be started and $\Delta X_t \overset{\text{def}}{=} \Delta X_{WSBIE}(t-1)$. Starting at the interval when the transition is begun, the position change may be limited at each interval due to the offset $\Delta X_t$. In particular, the position change may be limited to not vary by more than a magnitude $\epsilon$ that is a small predetermined value. The transition may be made over N steps, where N is the rounded-off value of $\|\Delta X_t\|/\epsilon$. Accordingly, at step 401, for k=1 ... N, the float solution can be transitioned to by the end of the transition period, where $$\Delta X_{WSBIE}(t+k) = \frac{N-k}{N}\Delta X_t.$$

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A method for determining a position of a satellite navigation receiver, comprising:
   determining estimated float narrow lane ambiguities of measured carrier phases associated with received signals from one or more satellites, based on estimated integer wide lane ambiguities and ionospheric-free float ambiguities;
   at a regular interval, determining a weighted sum of candidate narrow lane integer ambiguities for the measured carrier phases, based on the estimated float narrow lane ambiguities, using a modified best integer equivariant (BIE) process;
   during a search of the candidate narrow lane integer ambiguities, generating weighted sums of the candidate narrow lane integer ambiguities and a sum of weights, based on minimizing a mean-squared error (MSE) of the candidate narrow lane integer ambiguities and real valued parameters of a float solution comprising a state vector and a covariance matrix;
   calculating determined ambiguity values based on the weighted sums of the candidate narrow lane integer ambiguities and the sum of weights;
   forming a first constraint based on the determined ambiguity values, wherein the first constraint is for applying to a first copy of the float solution to calculate a first ambiguity determined position solution comprising a first ambiguity determined position estimate; and
   weighting the first ambiguity determined position solution to generate a first weighted ambiguity determined position solution by blending the float solution and the first ambiguity determined position solution.

2. The method of claim 1, wherein the weighted sums of the candidate narrow lane integer ambiguities and the sum of weights are adaptively scaled with changes in a magnitude of the maximum weight of the candidate narrow lane integer ambiguities.

3. The method of claim 1, wherein weights of the sum of weights are calculated as an exponential function of the quadratic form.

4. The method of claim 1, wherein the search of the candidate narrow lane integer ambiguities continues until no candidates remain with corresponding weights above a dynamically calculated threshold.

5. The method of claim 1, wherein the blending comprises minimizing an error variance of a combination of the float solution and the first ambiguity determined position solution.

6. The method of claim 1, wherein the blending is based on an acceptability factor that indicates whether the first ambiguity determined position solution is acceptable.

7. The method of claim 1, wherein the blending is based on a convergence indicator of the float solution that indicates that the float solution has achieved a steady state.

8. The method of claim 1, wherein the blending is based on values from a look-up table indexed by ranges of corresponding error variances and corresponding figures of merit of the float solution and the first ambiguity determined position solution.

9. The method of claim 1, further comprising transitioning a position solution from the first ambiguity determined position solution to the float solution.

10. The method of claim 9, wherein the transitioning is conducted at a regular interval and comprises:
    determining whether the transitioning is needed, based on a transition condition;
    if the transitioning is not needed, storing a position difference offset between the first ambiguity determined position solution and the float solution; and
    if transitioning is needed, adjusting the position solution over a number of intervals from the first ambiguity determined position solution to the float solution by an amount proportional to a previous difference offset until the position solution equals the float solution.

11. The method of claim 10, wherein the transition condition comprises one or more of an age of PPP corrections, an availability of the estimated integer wide lane ambiguities, a quality of the estimated float narrow lane ambiguities, or an availability of the determined ambiguity values.

12. The method of claim 1, further comprising transitioning a position solution from the first weighted ambiguity determined position solution to the float solution.

13. The method of claim 12, wherein the transitioning is conducted at a regular interval and comprises:

determining whether the transitioning is needed, based on a transition condition;

if the transitioning is not needed, storing a position difference offset between the first weighted ambiguity determined position solution and the float solution; and if transitioning is needed, adjusting the position solution over a number of intervals from the first weighted ambiguity determined position solution to the float solution by an amount proportional to a previous difference offset until the position solution equals the float solution.

14. The method of claim 13, wherein the transition condition comprises one or more of an age of PPP corrections, an availability of the estimated integer wide lane ambiguities, a quality of the estimated float narrow lane ambiguities, or an availability of the determined ambiguity values.

15. A satellite navigation receiver, comprising:
one or more processors;
a receiver for receiving satellite navigation signals from a plurality of satellites;
a memory in communication with the one or more processors and the receiver, the memory comprising a navigation positioning estimator executable by the one or more processors to:
determine estimated float narrow lane ambiguities of measured carrier phases associated with received signals from one or more satellites, based on estimated integer wide lane ambiguities and ionospheric-free float ambiguities;
at a regular interval, determine a weighted sum of candidate narrow lane integer ambiguities for the measured carrier phases, based on the estimated float narrow lane ambiguities, using a modified best integer equivariant (BIE) process;
during a search of the candidate narrow lane integer ambiguities, generate weighted sums of the candidate narrow lane integer ambiguities and a sum of weights, based on minimizing a mean-squared error (MSE) of the candidate narrow lane integer ambiguities and real valued parameters of a float solution comprising a state vector and a covariance matrix;
calculate determined ambiguity values based on the weighted sums of the candidate narrow lane integer ambiguities and the sum of weights;
form a first constraint based on the determined ambiguity values, wherein the first constraint is for applying to a first copy of the float solution to calculate a first ambiguity determined position solution comprising a first ambiguity determined position estimate; and
weight the first ambiguity determined position solution to generate a first weighted ambiguity determined position solution by blending the float solution and the first ambiguity determined position solution.

16. The satellite navigation receiver of claim 15, wherein the weighted sums of the candidate narrow lane integer ambiguities and the sum of weights are adaptively scaled with changes in a magnitude of the maximum weight of the candidate narrow lane integer ambiguities.

17. The satellite navigation receiver of claim 15, wherein weights of the sum of weights are calculated as an exponential function of the quadratic form.

18. The satellite navigation receiver of claim 15, wherein the search of the candidate narrow lane integer ambiguities continues until no candidates remain with corresponding weights above a dynamically calculated threshold.

19. The satellite navigation receiver of claim 15, wherein the blending comprises minimizing an error variance of a combination of the float solution and the first ambiguity determined position solution.

20. The satellite navigation receiver of claim 15, wherein the blending is based on an acceptability factor that indicates whether the first ambiguity determined position solution is acceptable.

21. The satellite navigation receiver of claim 15, wherein the blending is based on a convergence indicator of the float solution that indicates that the float solution has achieved a steady state.

22. The satellite navigation receiver of claim 15, wherein the blending is based on values from a look-up table indexed by ranges of corresponding error variances and corresponding figures of merit of the float solution and the first ambiguity determined position solution.

23. The satellite navigation receiver of claim 15, wherein the navigation positioning estimator is further executable by the one or more processors to transition a position solution from the first ambiguity determined position solution to the float solution.

24. The satellite navigation receiver of claim 23, wherein the transitioning of the navigation positioning estimator is conducted at a regular interval and comprises:
determining whether the transitioning is needed, based on a transition condition;
if the transitioning is not needed, storing a position difference offset between the first ambiguity determined position solution and the float solution; and
if transitioning is needed, adjusting the position solution over a number of intervals from the first ambiguity determined position solution to the float solution by an amount proportional to a previous difference offset until the position solution equals the float solution.

25. The satellite navigation receiver of claim 24, wherein the transition condition comprises one or more of an age of PPP corrections, an availability of the estimated integer wide lane ambiguities, a quality of the estimated float narrow lane ambiguities, or an availability of the determined ambiguity values.

26. The satellite navigation receiver of claim 15, wherein the navigation positioning estimator is further executable by the one or more processors to transition a position solution from the first weighted ambiguity determined position solution to the float solution.

27. The satellite navigation receiver of claim 26, wherein the transitioning of the navigation positioning estimator is conducted at a regular interval and comprises:
determining whether the transitioning is needed, based on a transition condition;
if the transitioning is not needed, storing a position difference offset between the first weighted ambiguity determined position solution and the float solution; and
if transitioning is needed, adjusting the position solution over a number of intervals from the first weighted ambiguity determined position solution to the float solution by an amount proportional to a previous difference offset until the position solution equals the float solution.

28. The satellite navigation receiver of claim 27, wherein the transition condition comprises one or more of an age of PPP corrections, an availability of the estimated integer wide lane ambiguities, a quality of the estimated float narrow lane ambiguities, or an availability of the determined ambiguity values.

* * * * *